United States Patent
Andritsos

(10) Patent No.: US 12,499,397 B2
(45) Date of Patent: Dec. 16, 2025

(54) ACCURATE AND TRANSPARENT PATH PREDICTION USING PROCESS MINING

(71) Applicant: ODAIA Intelligence Inc., Toronto (CA)

(72) Inventor: Periklis Andritsos, Toronto (CA)

(73) Assignee: ODAIA Intelligence Inc., Toronto (CA)

( * ) Notice: Subject to any disclaimer, the term of this patent is extended or adjusted under 35 U.S.C. 154(b) by 1153 days.

(21) Appl. No.: 17/416,832

(22) PCT Filed: Dec. 19, 2019

(86) PCT No.: PCT/CA2019/051857
§ 371 (c)(1),
(2) Date: Jun. 21, 2021

(87) PCT Pub. No.: WO2020/124240
PCT Pub. Date: Jun. 25, 2020

(65) Prior Publication Data
US 2022/0058558 A1    Feb. 24, 2022

Related U.S. Application Data

(60) Provisional application No. 62/869,844, filed on Jul. 2, 2019, provisional application No. 62/783,991, filed on Dec. 21, 2018.

(51) Int. Cl.
G06Q 10/0631 (2023.01)
G06F 18/20 (2023.01)
(Continued)

(52) U.S. Cl.
CPC ....... *G06Q 10/06315* (2013.01); *G06F 18/29* (2023.01); *G06N 5/02* (2013.01); *G06N 7/01* (2023.01)

(58) Field of Classification Search
CPC ... G06Q 10/06315; G06F 18/29; G06F 30/22; G06N 5/02; G06N 5/022
See application file for complete search history.

(56) References Cited

U.S. PATENT DOCUMENTS

2015/0332290 A1    11/2015    Gerber
2016/0292248 A1    10/2016    Garcia
(Continued)

FOREIGN PATENT DOCUMENTS

WO    2010048557 A2    4/2010

OTHER PUBLICATIONS

Langone, Rocco, Raghvendra Mall, and Johan AK Suykens. "Soft kernel spectral clustering." The 2013 International Joint Conference on Neural Networks (IJCNN). IEEE, 2013 (Year: 2013) (Year: 2013).*

(Continued)

*Primary Examiner* — Schyler S Sanks
(74) *Attorney, Agent, or Firm* — SMART & BIGGAR LP; Isis E. Caulder; Robert Baker

(57) ABSTRACT

The present disclosure generally relates to the field of data structures and in particular, a loop-aware footprint matrix data structure adapted for data process traversal. The proposed approach is directed to a computer-based analytic system and corresponding method that uses a specific data structure and processing thereof, in some embodiments, adapted to computationally estimate predictions of next events by first generating a data structure based on business process models obtained using process mining techniques, and then using the improved data structure for generating predictions, which can then be encapsulated in the form of computer instructions or machine instruction sets, having a specific sequence for execution.

14 Claims, 14 Drawing Sheets

(51) Int. Cl.
G06N 5/02 (2023.01)
G06N 7/01 (2023.01)

(56) References Cited

U.S. PATENT DOCUMENTS

2017/0083937 A1 3/2017 Fadli
2017/0310824 A1 10/2017 Piaggio et al.
2018/0075357 A1 3/2018 Subramanian et al.
2018/0240145 A1 8/2018 Zargham et al.

OTHER PUBLICATIONS

Van Oirschot, Y. P. J. M., et al. "Using trace clustering for configurable process discovery explained by event log data." university of technology, master of business information systems, department of mathematics and computer science (2014) (Year: 2014).*

Tax, N., Verenich, I., La Rosa, M., Dumas, M.: Predictive business process monitoring with LSTM neural networks. In: Dubois, E., Pohl, K. (eds.) CAiSE 2017. LNCS, vol. 10253, pp. 477-492. Springer, Cham (2017) (Year: 2017).*

Escalante, Hugo Jair, Manuel Montes, and Luis Enrique Sucar. "Particle swarm model selection." Journal of Machine Learning Research 10.2 (2009) (Year: 2009) (Year: 2009).*

Damerau, F.J., "A technique for computer detection and correction of spelling errors", Communications of the ACM 7(3), pp. 171-176,1964.

Hochreiter, S. et al., "Long short-term memory", Neural computation (8), pp. 1735-1780, 1997.

Pitkow, J. et al., "Mining longest repeating subsequences to predict world wide web surfing", In: Proc. UsENIX symp. on Internet Technologies and systems, p. 1, 1999.

Gueniche, T. et al., "Compact prediction tree: A lossless model for accurate sequence prediction", In: International Conference on Advanced Data Mining and Applications, pp. 177-188, Springer, 2013.

Leemans, S.J. et al., "Discovering block-structured process models from event logs-a constructive approach", In: International conference on applications and theory of Petri nets and concurrency, pp. 311-329, Springer, 2013.

Lakshmanan, G.T. et al., "A markov prediction model for data-driven semi-structured business processes", Knowledge and Information Systems 42(1), pp. 97-126, 2015.

Bolt, A. et al., "Scientific workflows for process mining: building blocks, scenarios, and implementation", International Journal on Software Tools for Technology Transfer No. 18, Nov. 1, 2016, pp. 607-628.

Breuker, D. et al., "Comprehensible predictive models for business processes", MIS Quarterly 40(4), pp. 1009-1034, 2016.

Evermann, J. et al, "A deep learning approach for predicting process behaviour at runtime", In: International Conference on Business Process Management, pp. 327-338, Springer, 2016.

Van Der Aalst, W., "Process Mining: Data Science in Action" pp. 163-178, 243-272, Springer, 2016.

Bernard, G. et al., "A Process Mining Based Model for Customer Journey Mapping", Proceedings of the Forum and Doctoral Consortium Papers presented at the 29th International Conference on Advanced Information Systems Engineering CAiSE Jun. 12, 2017 pp. 49-56.

Bernard, G. et al., "CJM-ex: Goal-oriented Exploration of Customer Journey Maps using Event Logs and Data Analytics", Proceedings of the 15th International Conference on Business Process Management BPM Sep. 10, 2017 (5 pages).

Leemans, S., "Robust process mining with guarantees", Ph. D. thesis, Eindhoven University of Technology, 2017.

Tax, N. et al., "Predictive business process monitoring with lstm neural networks", In: International Conference on Advanced Information Systems Engineering, pp. 477-492, Springer, 2017.

Alaybeyi, S. et al., "Build trust with business users by moving toward explainable ai", Tech. rep., Gartner, Oct. 2018.

Bernard, G. et al., "CJM-ab: Abstracting Customer Journey Maps Using Process Mining", Proceedings of the 30th International Conference on Advanced Information Systems Engineering CAiSE Jun. 11, 2018, pp. 49-56.

Breitmayer, Marius et al., "Applying Process Mining Algorithms in the Context of Data Collection Scenarios", Jan. 1, 2018, pp. 1-128 <https://dbis.eprints.uni-ulm.de/1682/1/MA_BRE_2018.pdf.

Polato, M. et al., "Time and activity sequence prediction of business process instances", Computing, pp. 1-27, 2018.

Terragni, A. et al., "Analyzing Customer Journey with Process Mining: from Discovery to Recommendations", Proceedings of the 6th IEEE International Conference on Future Internet of Things and Cloud, Aug. 6, 2018, pp. 224-229.

Vanhatalo, J. et al., "The refined process structure tree", In: International Conference on Business Process Management, pp. 100-115, Springer, 2018.

Xu, Yuhua et al., "Repairing Process Models with Logical Concurrent and Casual Relations via Logical Petri Nets", IEEE Access, vol. 6, Oct. 1, 2018, pp. 56340-56355.

Bernard, G. et al., "Accurate and Transparent Path Prediction Using Process Mining", Proceedings of the European Conference on Advances in Databases and Information Systems ADBIS, Sep. 8, 2019, pp. 235-250.

International Search Report and Written Opinion mailed Mar. 2, 2020 in International Patent Application No. PCT/CA2019/051857 (13 pages).

Extended European Search Report mailed Jun. 3, 2022 in European Patent Application No. 19897642.5 (10 pages).

* cited by examiner

| Traces | Terminology | | | | | | | | |
|---|---|---|---|---|---|---|---|---|---|
| | and2(1) | and2(2) | and2(3) | and4(1) | and4(2) | loop1 | xor7|loop5(1) | xor7|loop5(2) | xor3 |
| abdef 202a | 1 | 1 | 2 | 1 | 2 | 1 | f | ∅ | and4 |
| bdaegef 202b | 1 | 2 | 1 | 2 | 1 | 2 | g | f | and4 |
| dcefeg 202c | 2 | 1 | ∅ | ∅ | ∅ | 2 | f | g | c |
| cdef 202d | 1 | 2 | ∅ | ∅ | ∅ | 1 | f | ∅ | c |

ACCURATE AND TRANSPARENT PATH PREDICTION USING PROCESS MINING

CROSS-REFERENCE TO RELATED PATENT APPLICATIONS

This application is a 35 USC § 371 national stage entry of International Patent Application No. PCT/CA2019/051857, filed Dec. 19, 2019, which claims the benefit of U.S. Provisional Patent Application No. 62/783,991, filed Dec. 21, 2018, and the benefit of U.S. Provisional Patent Application No. 62/869,844, filed Jul. 2, 2019, and the entire contents of each of which are hereby incorporated by reference.

FIELD

The present disclosure generally relates to the field of data structures and in particular, a loop-aware footprint matrix data structure adapted for data process traversal.

BACKGROUND

In industries that focus on relationships, such as employee-focused, user-focused, patient-focused, or customer-focused industries, predictions of an individual's next interactions (or events) are desired. As described herein, an individual may include (but are not limited to) an employee, a user, a patient, a customer, etc. While previous solutions, including reporting software, provide statistics and statistical analysis of individual behavior, they do not provide predictions of an individual's next events.

These activity reports and analysis may be used to identify problematic interactions, issues relating to the interaction process with the individual, etc. While activity reports and analysis are helpful, they suffer from several flaws including the fact that they provide only aggregated analysis (i.e. of many users), and only provide information after the fact (i.e. they are not predictions).

Individual retention, and planned intervention events remain challenges for organizations.

Anticipating the next events is valuable in a range of scenarios, including, for example, computer processing and function evaluation. The timing of processing events and the sequence thereof affects computer programming efficiency and performance.

SUMMARY

In a first aspect, some embodiments of the invention provide a computer implemented method for maintaining a matrix data structure adapted for storing a representation of a data process log including one or more data process traces, each data process trace representing a sequential series of execution instructions, the method comprising: receiving a process tree data structure generated by a process discovery engine configured to process the data process log to record algebraic splits represented in the data process log as one or more data operator functions; initializing the matrix data structure by: instantiating one or more rows, each row corresponding to a corresponding data process trace of the one or more data process traces; instantiating one or more columns, each column corresponding to a corresponding data operator function in the one or more data operator functions; and populating each cell of the matrix data structure by replaying the corresponding data process trace on the process tree data structure to determine one or more indices assigned to each data operator function of the one or more data operator functions.

In one or more embodiments, the one or more data operator functions may comprise at least one of a group of (i) an exclusive choice operator (XOR), (ii) a parallel operator (AND), (iii) a sequence operator (SEQ), (iv) a loop operator (LOOP), (v) or combinations thereof.

In one or more embodiments, the process discovery engine may be configured to recursively process the data process log to record algebraic splits.

In one or more embodiments, the data process log may represent an execution log of executed computer instructions by a computer processor, and each data process trace of the one or more data process traces may represent a set of sequential processing events of the computer processor.

In one or more embodiments, the each sequential processing event may represent a transition between states of a concurrent processing model maintained by the computer processor.

In one or more embodiments, the method may further comprise recursively generating a process path prediction suffix for a prefix representing a set of n events observed from an uncompleted data process trace using the matrix data structure by: iteratively adding sequential events to the process path prediction suffix until an end of a Petri Net represented in the process tree data structure by: generating, a list of active tokens; establishing, from the list of active tokens, a list of active transitions; while a number of active transitions is greater than one, recursively: selecting a selected data operator function of the one or more data operator functions that is common to at least two transitions and that is closest to a root; selecting a predicted transition depending on an operator type of the selected data operator function, the predicted transition including at least one of a selection of a branch for a next execution, a decision to be established at an exclusive gateway, or whether to stay in or leave a loop; determining an updated number of active transitions, and if the number of active transitions is greater than one, recursing to the selecting of a next data operator function; executing the predicted transition to add a sequential event onto the process path prediction suffix; and returning the suffix as a data structure, which in combination with the prefix represents a predicted completed data process trace based on the uncompleted data process trace.

In one or more embodiments, one or more execution processing instructions for a computer processor may be generated based on the predicted completed data process trace.

In one or more embodiments, the selecting of the predicted transition may include determining that a particular order established in a current prefix being recursed is not represented in any of the one or more data process traces; and the selecting of the predicted transition may further include a first, a second, and a third sequential step of selection, which may be applied consecutively when a previous step fails; a first sequential step may be to use the matrix data structure as-is; a second sequential step may be to drop a loop portion of the matrix data structure and to concatenate columns for a same operator; and a third sequential step is to make a decision by observing only the Petri Net represented by the process tree data structure.

In one or more embodiments, the process discovery engine may be an inductive data miner engine.

In one or more embodiments, the process discovery engine may include a plurality of process discovery mechanisms used in concert to generate a plurality of process path predictions; and the method may comprise: training the process discovery engine using a machine learning engine and a training set of labelled paths and corresponding predictions to determine an optimal process discovery mechanism of the plurality of process discovery mechanisms; and tuning the process discovery engine to utilize the optimal process discovery mechanism of the plurality of process discovery mechanisms.

In one or more embodiments, the training set of labelled paths may include decomposed segmentations of the one or more data process traces, where the one or more data process traces may be decomposed into a plurality of combinations of prefixes and suffixes, such that the prefixes establish an evaluation set and the suffixes may establish a ground truth set.

In one or more embodiments, the one or more data process traces may be clustered into a plurality of clusters grouping similar data process traces.

In one or more embodiments, a number of clusters of the plurality of clusters may be determined using a hyperparameter optimization of a type grid search using a portion of a training data set.

In one or more embodiments, the clustering may be conducted using a soft clustering approach where, for each data process trace, a probability of the data process trace belonging to each cluster in the plurality of clusters may be established.

In one or more embodiments, only the similar data process traces having probabilities greater than a pre-defined value of belonging to each cluster of the plurality of clusters may be used to establish the process tree data structure, and the process tree data structure may be transformed to a Petri Net such that the similar data process traces having probabilities less than or equal to the pre-defined value can be replayed upon the process tree data structure.

In one or more embodiments, a stochastic gradient descent classifier may be trained to predict which cluster a prefix belongs to, and a suffix of a given prefix may be predicted using the cluster returned by the stochastic gradient descent classifier.

In a second aspect, there is provided a computer implemented system for maintaining a matrix data structure adapted for storing a representation of a data process log including one or more data process traces, each data process trace representing a sequential series of execution instructions, the system comprising: a process discovery engine configured to generate a process tree data structure by processing the data process log to record algebraic splits represented in the data process log as one or more data operator functions; a computer processor configured to initialize the matrix data structure on data storage by: instantiating one or more rows, each row corresponding to a corresponding data process trace of the one or more data process traces; instantiating one or more columns, each column corresponding to a corresponding data operator function; and populating each cell of the matrix data structure by replaying the corresponding data process trace on the process tree data structure to determine one or more indices assigned to each data operator function of the one or more data operator functions.

In one or more embodiments, the one or more data operator functions may comprise at least one of a group of (i) an exclusive choice operator (XOR), (ii) a parallel operator (AND), (iii) a sequence operator (SEQ), (iv) a loop operator (LOOP), (v) or combinations thereof.

In one or more embodiments, the process discovery engine may be configured to recursively process the data process log to record algebraic splits.

In one or more embodiments, the computer processor may be further configured to recursively generate a process path prediction suffix for a prefix representing a set of n events observed from an uncompleted data process trace using the matrix data structure by: iteratively adding sequential events to the process path prediction suffix until an end of a Petri Net represented in the process tree data structure by: generating, a list of active tokens; establishing, from the list of active tokens, a list of active transitions; while a number of active transitions is greater than one, recursively: selecting a selected data operator function of the one or more data operator functions that is common to at least two transitions and that is closest to a root; selecting a predicted transition depending on a type of the selected data operator function, the predicted transition including at least one of a selection of a branch for a next execution, a decision to be established at an exclusive gateway, or whether to stay in or leave a loop; determining an updated number of active transitions, and if the number of active transitions is greater than one, recursing to the selecting of a next data operator function; executing the predicted transition to add a sequential event onto the process path prediction suffix; and returning the suffix as a data structure, which in combination with the prefix represents a predicted completed data process trace based on the uncompleted data process trace.

In one or more embodiments, the process discovery engine may include a plurality of process discovery mechanisms used in concert to generate a plurality of process path predictions; and the process discovery engine may be adapted to: train the process discovery engine using a machine learning engine and a training set of labelled paths and corresponding predictions to determine an optimal process discovery mechanism of the plurality of process discovery mechanisms; and tune the process discovery engine utilize the optimal process discovery mechanism of the plurality of process discovery mechanisms; wherein the training set of labelled paths may include decomposed segmentations of the one or more data process traces, where the one or more data process traces may be decomposed into a plurality of combinations of prefixes and suffixes, such that the prefixes establish an evaluation set and the suffixes may establish a ground truth set.

In one or more embodiments, the one or more data process traces may be clustered into a plurality of clusters grouping similar data process traces; wherein a number of clusters of the plurality of clusters may be determined using a hyperparameter optimization of a type grid search using a portion of a training data set and wherein the clustering may be conducted using a soft clustering approach where, for each data process trace, a probability of the data process trace belonging to each cluster of the plurality of clusters is established.

In one or more embodiments, only the similar data process traces having probabilities greater than a pre-defined value of belonging each cluster of the plurality of clusters may be used to establish the process tree data structure, and the process tree data structure may be transformed to the Petri Net such that the similar data process traces having probabilities less than or equal to the pre-defined value can be replayed upon the process tree data structure; and wherein a stochastic gradient descent classifier may be trained to predict which cluster the prefix belongs to, and a suffix of a given prefix may be predicted using the cluster returned by the stochastic gradient descent classifier.

In a third aspect, there is provided a user interface for reviewing a process path prediction based on a plurality of event traces, the user interface comprising: a first panel for displaying a business model; a second panel for displaying the process path prediction, the second panel for receiving a predicted event user input, and responsive to the predicted event user input, displaying an activity in the process path prediction; a third panel for displaying an analysis of the process path prediction based on a plurality of event traces, the third panel for receiving an explanation user input, and responsive to the explanation user input, displaying one or more explanation event traces in the plurality of event traces.

BRIEF DESCRIPTION OF THE DRAWINGS

A preferred embodiment of the present invention will now be described in detail with reference to the drawings, in which.

Figure 1A:
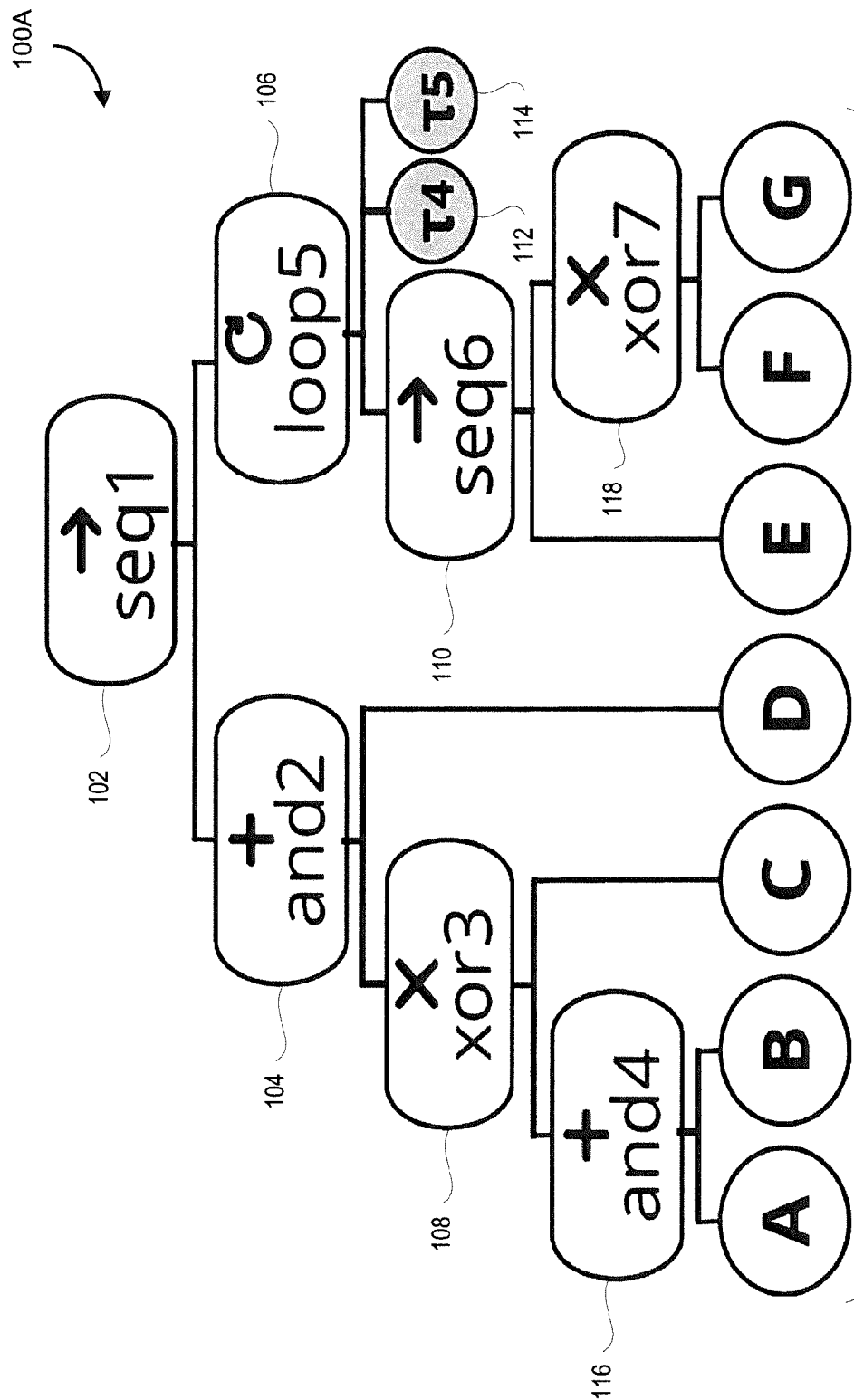
FIG. 1A is a graphical representation of an example process tree obtained by the inductive miner with the traces: {⟨ABDEF⟩, ⟨BDAEGEF⟩, ⟨DCEFEG⟩, ⟨CDEG⟩}, according to some embodiments.

In the figures, embodiments are illustrated by way of example. It is to be expressly understood that the description and figures are only for the purpose of illustration and as an aid to understanding.

DESCRIPTION OF EXEMPLARY EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Embodiments of the present application provide solutions for predicting the next events of an individual, whether a user, a patient, a customer, or an employee. These predicted next events may be used by an organization to plan intervention events that may be used to improve retention of the individual and avoid the departure of the individual from the organization.

As described herein, the predicted next events may be generated after observing a few events of an incomplete sequence of activities, and one may predict the next events until process completion by learning from historical event logs. The prediction of next events may be described as path prediction.

There are two main approaches used to make predictions for a series of events. The first approach is process mining and the second approach relies on neural networks.

Process mining may be more transparent than neural network based approaches because it relies on models that can be inspected (e.g., by data scientists, by computer-based models, by business analysts). This may be important, as the inspection mechanisms (e.g., business analysts) may have hidden knowledge that may be added to influence the prediction, and their confidence in the prediction.

Furthermore, it has been said that "business stakeholders are not data scientists . . . they are more likely to trust and use these models if they have a high-level understanding of the data that was used to train these models" [2]. Provability and explainability are therefore desirable in solving the retention problem because it helps to inform business stakeholders who are involved in decision making.

In contrast, reasoning about predictions made by artificial neural networks may be complex, and in some cases impossible. Furthermore, a neural network may require a long training time [12]. However, in terms of performance, predictions using long short-term memory (LSTM) in a neural network may achieve high accuracy [13].

The area of predictive analytics may apply broadly, since the data collected may have many dimensions. The trace predictions made based on the collected data may be time-related (e.g., predicting the remaining time), outcome-oriented (e.g., success vs. failure), or control-flow oriented (e.g., next event(s) prediction).

A widely adopted approach to path prediction is to build a Markov chain that describes the transition probabilities between events. These transition probabilities are used to make predictions. A prediction depends only on the previously observed event. In the all-K-order Markov model, [11], the number of levels in the Markov chain is increased, but this increases the execution time.

While the accuracy of the prediction increases when using a Markov chain, it suffers from rigidness in terms of the "patterns that it can learn" [6]. As another approach, Gueniche et. al, propose the compact prediction tree [6]. It uses three data structures that can be used efficiently to retrieve the most probable event that might occur after having observed a prefix. While it predicts with high accuracy which events might occur in the suffix, it does not return the order in which they will be executed. Hence, compact prediction trees are not suitable for predicting paths.

There are several process mining approaches for predicting paths. In [8], Lakshmanan et al. propose a method that estimates the likelihood of the next activities using a process model and Markov chain. Breuker et al. propose in [3] a predictive framework that uses grammatical inference and an expectation-maximization algorithm to estimate the model parameters.

Among its predictions, the Breuker et al. predictive framework can predict the next event. Improving the comprehensibility of the predictions is one of the design goals of their approach, so that "users without deep technical knowledge can interpret and understand" [3]. In [12], Polato et al. propose a labeled transition system and methods for several predictive analytic tasks. Path prediction can be done by finding a path in the transition system that minimizes the sum of the weights between the edges.

Recently, neural networks have been studied for predicting the next events. Evermann et al. uses a LSTM neural network approach to predict the next event of an ongoing trace [5]. LSTM, [7], is a special type of neural network for sequential inputs. It can learn from long-term dependencies using a sophisticated memory system.

The LSTM system is a double-edged sword: it achieves high accuracy; however, its inherent complexity prevents any inspection of the reasoning behind the predictions. In [13], Tax et al. generalize the approach of [5]. They evaluate, amongst other methods, the performance of the process in path prediction and show that it is more accurate than [5, 3, 12].

In this section, definitions are provided as known in the art, and as part of the process mining discipline.

In various approaches described herein, the approach may be adapted to computationally evaluate only the sequence of events, disregarding the timestamps or any other contextual information in the data. By doing so, the approach of some embodiments may present a simplified view of process mining, to be complemented with process mining approaches [1].

Events. An event may be a discrete type of data representing the activities executed in a process (e.g., a data process for computational evaluation and functional programming, such as when functions are invoked and executed). For instance, transferring a ticket may be an event in a ticket's lifecycle. Let e be an event and E be the set of all distinct events; i.e., $e \in E$. Events may occur sequentially with other events, concurrently with other events, or a combination thereof. The events may include a label (or name), a type, and other metadata such as one or more timestamps.

Trace. A trace may be an instance of a process execution. In the service desk example, a trace is a ticket. Let $t=\{e_1, e_2, \ldots ; e \in E\}$ be a trace: a list of events. For instance ⟨ABBC⟩ is a trace with three distinct events of length 4(|t|=4). A trace may be executed computer instruction from a computer processor.

Prefix. Let a prefix $p_n=\{e_1, e_2, \ldots, e_n; e \in t\}$ be the first n events of a trace. Typically, if t={ABBC} then $p_3$={ABB}. A prefix represents the few events observed from an uncompleted trace that are used to make a prediction.

Suffix. A suffix represents the n last events of a trace. Formally, Sn={$e_{|t|}$−n, . . . , $e_{|t|-1}$, $e_{|t|}$; $e \in t$; $e \notin p_n$; $|p_n|$+ |Sn|=|t|}, i.e., the suffix is the complement of the prefix. The suffix is the set of events that the system is trying to predict.

Event logs. An event log L={$t_1, t_2, \ldots$;} is a collection of traces. The event logs may be an collection of execution traces of computer instruction from a computer processor.

By looking at the event log, process discovery techniques may allow one to infer the business process model that describes well the behavior of the traces.

This may be a challenging task because the approach should be able to generalize behaviors even if only a subset of them is observed, to exclude noise and outliers, and to discover a model that is simple enough that it can be analyzed by a business analyst but also precise enough to reflect the behaviors of the event logs.

Several techniques and approaches have been proposed to tackle this task. As described herein, an approach can use an inductive miner, but other approaches are possible [9]. In an alternate embodiment, a fuzzy miner may be used.

The inductive miner works by finding a selected split in an event log into a first part and a second part, and determining how the two parts are related. The inductive miner may do this recursively on both the first part and the second part.

Referring to FIG. 1A, there is shown an example process tree output 100A of the inductive miner. The process tree 100A (encapsulated as a process tree data structure) is a representation of a process model introduced in [14]. The process tree 100A may be obtained by the inductive miner using the historical event traces: {⟨ABDEF⟩, ⟨BDAEGEF⟩, ⟨DCEFEG⟩, ⟨CDEG⟩}.

Figure 1B:
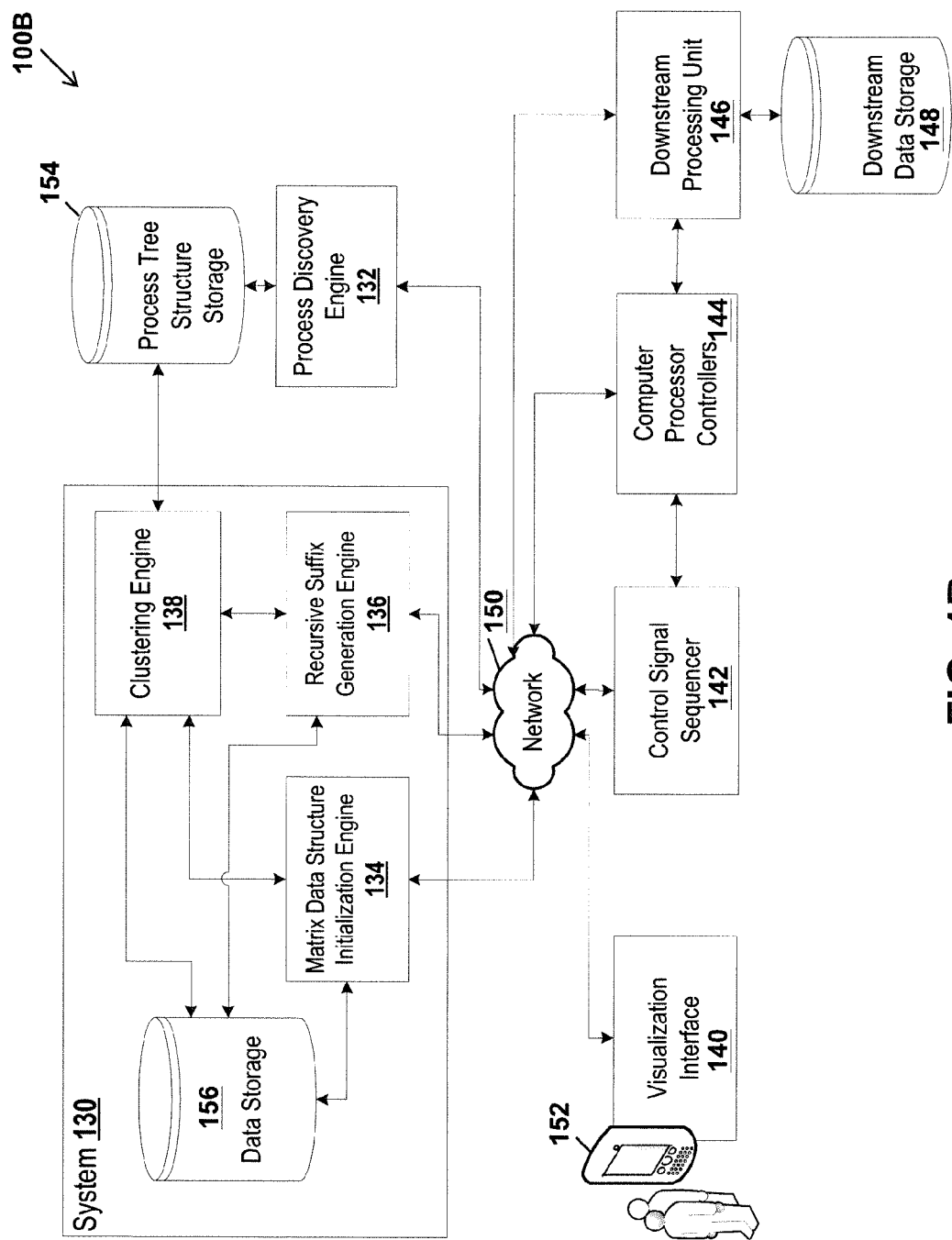
FIG. 1B is an example block schematic diagram, according to some embodiments.

Referring next to FIG. 1B, there is shown is a block schematic 100B of an example system for maintaining a matrix data structure adapted for storing a representation of a data process log including one or more data process traces, where each data process trace represents a sequential series of execution instructions, according to some embodiments.

The system 130 includes a process discovery engine 132 configured to generate a process tree data structure by recursively processing the data process log to record algebraic splits of the events in each trace represented in the data process log as one or more data operator functions including at least one of (i) an exclusive choice operator, XOR, (ii) a parallel operator, AND, (iii) a sequence operator, SEQ, (iv) a loop operator, LOOP, (v) or combinations thereof. The data process log and the process tree data structures generated by the process discovery engine 132 may be stored in process tree structure storage 154.

The process discovery engine 132 may determine a plurality of process path predictions using a plurality of process discovery mechanisms, including an alpha-algorithm, heuristic mining, genetic process mining, region-based process mining, and/or inductive mining The plurality of process discovery mechanisms may be used in concert to generate a plurality of process path predictions; and the process discovery engine is adapted to: train the process discovery engine 132 using a machine learning engine and a training set of labelled paths and corresponding predictions to determine an optimal process discovery mechanism of the plurality of process discovery mechanisms; and tune the process discovery engine 132 to utilize the optimal process discovery mechanism of the plurality of process discovery mechanisms. The process discovery engine 132 may store the determined optimal process discovery mechanism in the process tree structure storage 154.

The process tree structure storage 154 may be a database such as a Structured Query Language (SQL) database such as PostgreSQL or MySQL or a not only SQL (NoSQL) database such as MongoDB.

The training set of labelled paths stored in the data storage 156 can include, for example, decomposed segmentations of the one or more data process traces, where the one or more data process traces are decomposed into a plurality of combinations of prefixes and suffixes, such that the prefixes establish an evaluation set and the suffixes establish a ground truth set.

Figure 12:
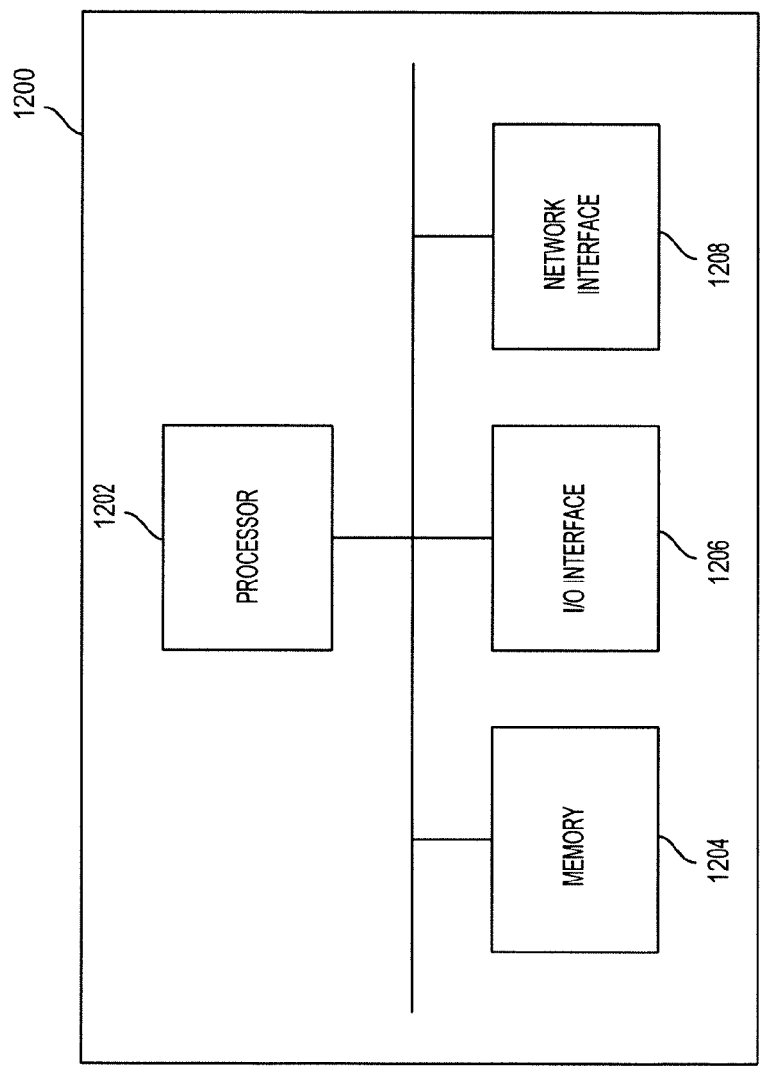
FIG. 12 is an illustration of an example computing device, according to some embodiments.

The system 130, including matrix data structure initialization engine 134, data storage 156, clustering engine 138 and recursive suffix generation engine 136 may run on a server such as the one in FIG. 12.

A matrix data structure initialization engine 134 may receive a process tree data structure generated by a process discovery engine.

The matrix data structure initialization engine 134 is configured to initialize the matrix data structure on data storage 156 by: instantiating one or more rows, each row corresponding to a corresponding data process trace of the one or more data process traces; instantiating one or more columns, each column corresponding to a corresponding data operator function, and populating each cell of the matrix data structure by replaying the corresponding data process trace on the process tree data structure to determine one or more indices assigned to each data operator function of the one or more data operator functions. The data operator functions may include, as described in more detail below, (1) the exclusive choice operator, $^{xor}$; (2) the parallel operator, $^{and}$, (3) a sequence, seq, operator and (4) a loop operator.

The data storage 156 may be a database such as a Structured Query Language (SQL) database such as PostgreSQL or MySQL or a not only SQL (NoSQL) database such as MongoDB.

A recursive suffix generation engine 136 is configured to recursively generate a process path prediction suffix for a prefix representing a set of n events observed from an uncompleted data process trace using the matrix data structure by: iteratively adding sequential events to the path prediction suffix until an end of a Petri Net represented in the process tree data structure.

The recursive suffix generation engine 136 generates, a list of active tokens; establishes, from the list of active tokens, a list of active transitions; and while the number of active transitions is greater than one, recursively: selects a data operator function of the one or more data operator functions that is common to at least two transitions and that is closest to a root; selects a predicted transition depending on the data operator function type, the predicted transition including at least one of a selection of a branch for a next execution, a decision to be established at an exclusive gateway, or whether to stay in or leave a loop; determines an updated number of active transitions, and if the number of active transitions is greater than one, recursing to the selecting of a next data operator function.

The recursive suffix generation engine 136 then executes the predicted transition to utilize the prediction to add a sequential event onto the process path prediction suffix; and returns the suffix as a data structure, which in combination with the prefix represents a predicted completed data process trace based on the uncompleted data process trace.

In some embodiments, a clustering engine 138 is utilized wherein the one or more data process traces are clustered into a plurality of clusters grouping similar data process traces.

The number of clusters of the plurality of clusters can be determined using a hyperparameter optimization of a type grid search using a portion of a training data set and wherein the clustering is conducted using a soft clustering approach where, for each data process trace, a probabilities of the data process trace belonging to all the clusters is established.

In some embodiments, only the data process traces having probabilities greater than a pre-defined value of belonging to all the clusters are used to establish the process tree data structure, and the process tree data structure is transformed to a Petri Net such that the data process traces having probabilities less than or equal to the pre-defined value can be replayed upon the process tree data structure; and wherein a stochastic gradient descent classifier is trained to predict which cluster a prefix belongs to, and a suffix of a given prefix is predicted using the cluster returned by the classifier.

The system 130 may be connected to a visualization interface 140 at a user device 152, a control signal sequencer 142, one or more computer processor controllers 144, and a downstream processing unit 146 via network 150. Network 150 may be a communication network such as the Internet, a Wide-Area Network (WAN), a Local-Area Network (LAN), or another type of network. Network 104 may include a point-to-point connection, or another communications connection between two nodes.

The user device 152 may be a mobile device such as a smartphone (including an Android® device or an Apple® device), a laptop, a desktop, or another computing device as known. The user device 152 may be used by an end user to access an application (not shown) running on system 130. For example, the application may be a web application, or a client/server application. The user device 152 may display the application in a web browser, and may allow a user to review business model information, and path predictions for individuals.

Figure 13:
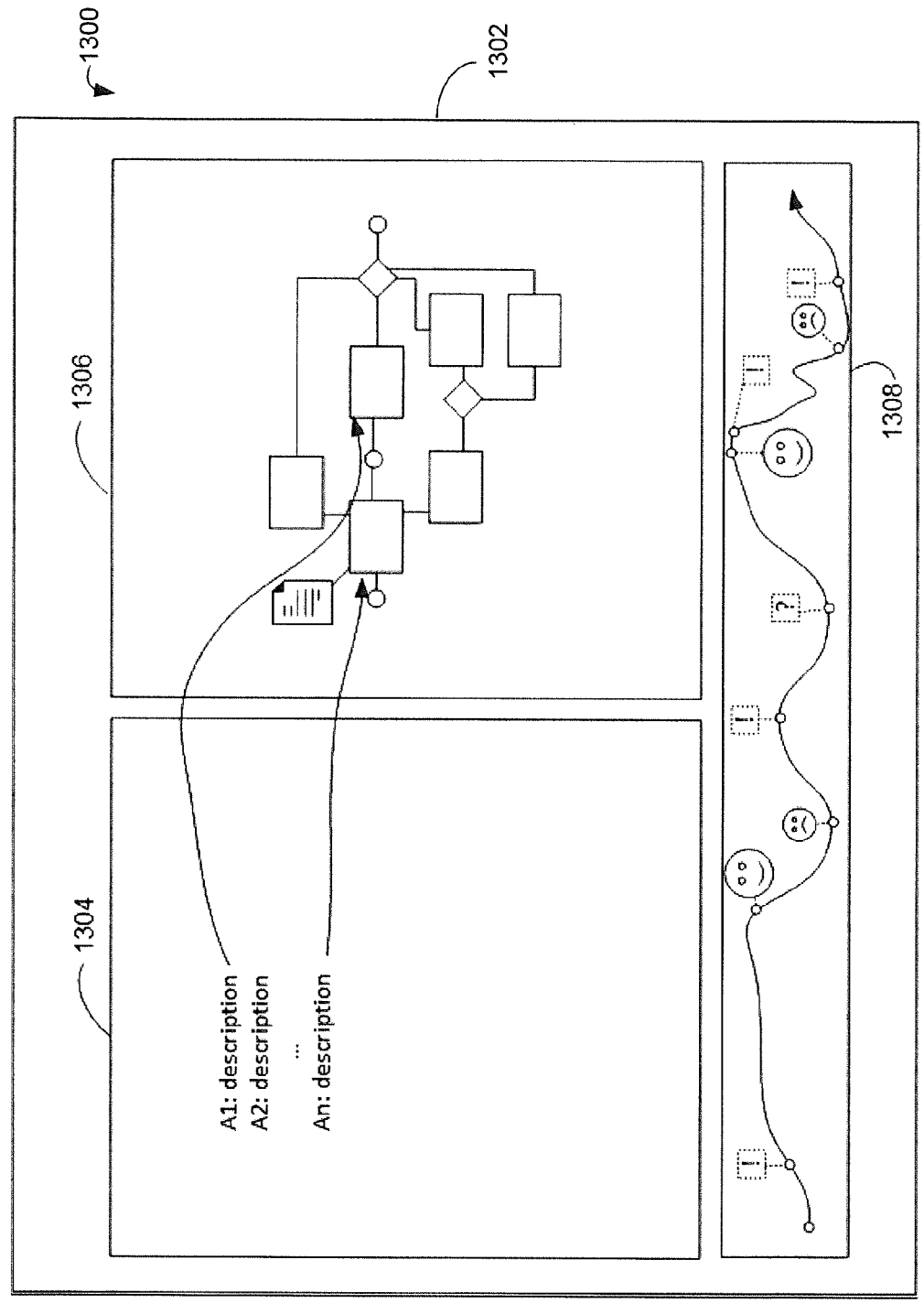
FIG. 13 is an example user interface, according to some embodiments.

The visualization interface 140 of the user device 152 may be used to present a user interface, such as one of the one in FIG. 13 and to allow the user to interact with system 130 in order to review and edit business processes and path predictions.

Referring to FIG. 13, there is shown a user interface 1300 that may be generated by the visualization interface 140 of the user device 152 (see FIG. 1B) which may be used in an interactive fashion when predictions are made. The prediction may include an outcome, and the outcome may be the suffix predicted and a business model. The right hand side portion 1306 of the interface can show the business model while the left hand side portion 1304 shows the activities that are predicted and constraints/rules (coming out of the model). The left side portion 1304 may show a listing of predicted activities for a particular individual (user, patient, or otherwise). The business model portion 1306, may show a flowchart that is determined based on the event log data. The business model portion 1306 may show a series of states, decisions, and interconnections representing how an individual interacts with the organization.

A user may use the user interface 1300 in order to review a predicted path for an individual. The user may edit the predicted activities on the left side 1304, or reorder the predicted activities. The user may edit or reorder the predicted activities by providing user input, for example, with a mouse, keyboard, or touch screen on the device 152 (see FIG. 1B).

The business model portion 1306 on the right side may be held static, i.e., it may not be changed while the predictions on the left hand side portion 1304 can be edited. This way, if there are activities to be changed both in terms of nature (e.g. replace one predicted activity with another) or whose order needs to be changed, a user may be able to discover if they adhere to the given model.

The bottom panel 1308 spans across the width of the screen 1302 and provides explanations of the predicted suffixes in the right hand side portion 1306. The bottom panel 1308 may show an individual sentiment analysis, an annotation of one or more events in the prefix, and an association of one or more predicted suffixes based on the traces used in order to make the prediction. The LaFM representation as well as the cluster based prediction may allow for bookkeeping the provenance of each prediction. This means that the traces responsible for the prediction at hand may be seen and explained.

A user may use the bottom panel 1308 to submit user input using a user input device to identify and explain why a particular activity has been predicted has been selected. This may be performed by the user selecting elements of the bottom panel 1308.

Referring back to FIG. 1B, the control signal sequencer 142 may pre-process data from $3^{rd}$ party systems for importation into the data storage 156, the process tree structure storage 154, or other parts of system 130 in order to prepare event log data for processing.

The one or more computer processor controllers 144 may be other third-party computer systems, such as an Employee Relationship Management (ERM) application or a Customer Relationship Management (CRM) application. The path predictions generated by the system 130 may be provided to such third-party systems in order to enable them to intervene with individuals who are at risk of departure.

The downstream processing unit 146 may be used in order to prepare reporting data for use with the one or more computer processor controllers 144 and the visualization interface 140. The downstream processing unit 146 may store results of the downstream processing in downstream data storage 148. The downstream data storage 148 may be a database such as a Structured Query Language (SQL) database such as PostgreSQL or MySQL or a not only SQL (NoSQL) database such as MongoDB.

These aspects will be described in greater detail in the sections below.

A process tree, shown as 100A, can be based on a set of potential actions shown as element 120. The process tree 100A is a data structure that can uses four operators: (1) the exclusive choice operator, xor, expresses that only one of the branches is executed; (2) the parallel operator, and, indicates that all the branches should be executed, in any order; and (3) a sequence, seq, forces the execution of the branches from left to right. Finally, (4) a loop has a more complex execution scheme: the first branch is executed at least once. Then, either the approach includes entering the loop by executing the second branch and the first branch again (which can be done once or multiple times), or executing the third branch to exit the loop. Elements 102, 104, 106, 108, 110, 116, 118 are shown as example operators.

As can be seen in the example 100A in FIG. 1A, except for the leaves, these four operators fill the whole tree. The leaves of the example tree 100A may be composed of the events E as well as silent activities. Silent activities, $\tau$, elements 112, 114) can be executed like any other events in the model, but they will not be seen in the traces.

Path prediction is concerned with predicting the suffix (e.g., a suffix set of sequential instruction sets) for a given prefix (e.g., a prefix set of sequential instruction steps that occur prior to the prefix) by learning from event logs. It differs from process model discovery in which the goal is to discover a process model from event logs. While the output is different, both methods are about understanding the control flow of traces. As noted, some embodiments leverage this by using the inductive miner as a first step in making predictions.

LaFM: Loop-Aware Footprint Matrix

LaFM may be adapted to store the behavior of traces efficiently when replayed on business process models. The aim is that the behaviors can be retrieved when predicting a suffix of events. First, the LaFM data structure of some embodiments is described, along with implementation details for initialization and population, and then usage for generating computational predictions, which can then be encapsulated into machine executable instruction sets or control/command signals for downstream process or device consumption. The LaFM data structure can be stored as a relational database element (e.g., a table of rows and columns), a set of linked lists, or as a graph structure data element, among others.

LaFM Data Structure

Figure 2:
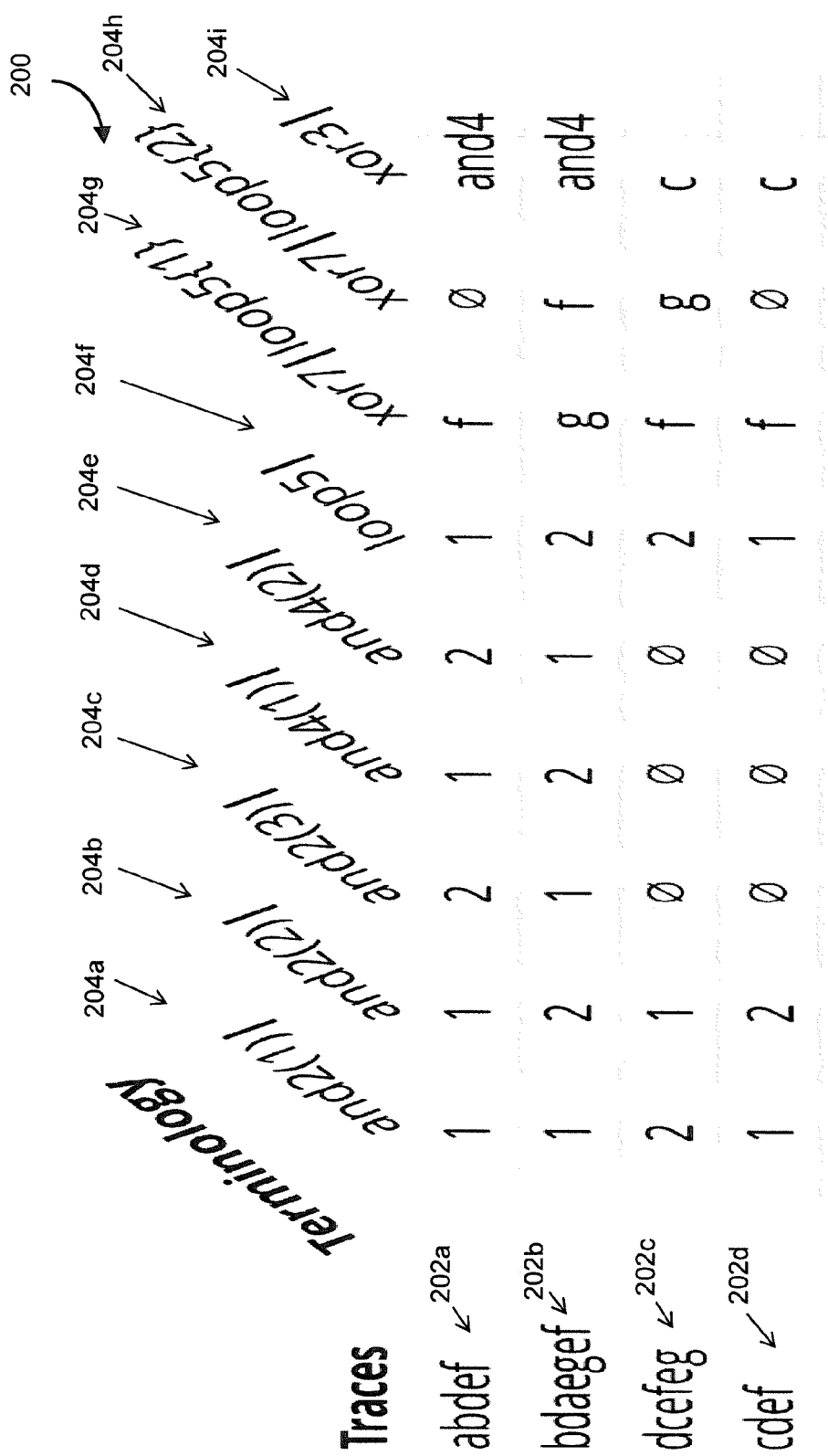
FIG. 2 is an example data structure representation of LaFM when the traces ⟨ABDEF⟩, ⟨BDAEGEF⟩, ⟨DCEFEG⟩, and ⟨CDEG⟩ are replayed on top of the process tree of FIG. 1A, according to some embodiments.

Referring next to FIG. 2, there is shown an example illustration of LaFM 200. The LaFM records the behavior of traces when replayed on top of a business process model. Each row may correspond to a trace and each column describes the behavior of an operator. The LaFM may capture the execution orders of parallel branches, the exclusive choices, and the number of iterations of each loop. The LaFM data structure may permit for explainable path predictions that may allow a user to return to the trace data used to make a prediction to show why a prediction was made.

Parallel branches. The LaFM may store the order in which parallel branches are executed.

An incremental index may be assigned to each outgoing branch of the and operators and then propagated to the events and silent activities underneath. For instance, $^{and2}$ in FIG. 1A has two outgoing branches. The index 0 is assigned to the first branch, which is propagated to the events below, i.e., 0 is assigned to A, B, and C. Similarly, task D has index 1. The index is recorded in LaFM for each $^{and}$ operator.

Exclusive choices. The decision made for each exclusive choice may be recorded in LaFM. For example, at xor3 in FIG. 1A, a choice must be made between and4 and C. For the trace ⟨ CDEG ⟩, the choice is C. Hence, C is recorded in LaFM.

Loops. LaFM stores the number of times loops are executed. In FIG. 1A for the trace ⟨ CDEG ⟩, the value recorded for loop5 is 1 because it was executed once.

Terminology. An operator might be executed multiple times during a single process execution. For instance, when the trace ⟨ BDAEGEF ⟩ 202b is replayed on the process tree in FIG. 1A, the system executes the operator xor7 twice because loop5 above it is also executed twice (see 204g). The name loop-aware footprint matrix reflects that the matrix can store all behaviors, regardless of the number of times a loop is executed. The terminology used for columns in LaFM allows one to retrieve the behaviors of an operator using a standardized name: operator|loop. Each operator is assigned a unique label (e.g., name).

For example, in FIG. 1A, loop5 is an operator. For parallel gateways, the system also appends the execution order inside parentheses. For instance, the second execution of and4 is and4(2). If there are loops, a single operator can be executed many times, resulting in multiple pieces of information that may be recorded.

Adding the loop position to the terminology allows one to distinguish this information. Let L be a list of loops that are in the path starting from but excluding the operator itself to the root of the process tree. L can be empty if an operator is not contained in a loop. Then, the system concatenates $\forall l \in L$ the following strings: $l_{name}(l_{index})$, for each loop above an operator, the name can be included. In parentheses, the approach can include adding the index of the loop. As an example, xor7|loop5{2} (see 204h) points to the column returning the decisions that are made when the operator xor7 is executed for the second time.

Three behaviors are captured in the LaFM example in FIG. 2. Columns 1 to 5 (see 204a, 204b, 204c, 204d, and 204e) retain the execution order of parallel gateways; column 6 (see 204f) records the number of times a loop was taken, and columns 7 to 9 (see 204g, 204h, and 204i) store the decisions made at exclusive choice gateways.

Training Phase: Building LaFM

To record the decisions made for each operator in the discovered process tree, the process includes replaying the traces to be learned from using a Petri net version of the process tree. Petri nets may be derived from process trees using transformation rules [9]. Petri nets have a strong and executable formalism, which means that one can replay a trace on a Petri net by playing the token game [10]. The token game takes as input a trace and a Petri net. Then, using a particular set of rules, the game indicates if the trace fits into the process model (i.e., the Petri net). Process 1 defines a few extra operations that are performed during the token game to build LaFM.

Process 1: Set of Operations Performed During Token Game to Build LaFM
Prediction Phase: using LaFM

```
*/  Map the parallel operators above the events using a list of tuples (andOperator,
    branchIndex). Return an empty list if the event is not included in a parallel operators.
    */
/*  e.g.,: {a: [(and4,0), (and2,0)], b: [(and4,1), (and2,0)], c: [(and2,0)]...}        */
1 tsToAnds = getTransitionToAnds(processTree)
```

Process 1: Set of Operations Performed During Token Game to Build LaFM
Prediction Phase: using LaFM

```
   /*  Map the transitions that occur right after an exclusive gateway.       */
   /*  e.g.,: {and4: Xor3, C: Xor3, F: Xor7, G: Xor7 }                        */
 2 tsToXors = getTransitionToXor(processTree)
   /*  Map the second branch of loops to tsIncrementLoops and the third one to
       tsLeaving Loops                                                        */
   /*  e.g., tsIncrementLoops: {τ4: loop5}; tsLeavingLoops: {τ5: loop5}       */
 3 tsIncrementLoops = getTransitionToIncrementLoop(processTree)
 4 tsLeavingLoops = getTsToLeaveLoop(processTree)
 5 laFM = Matrix[ ]
 1 foreach trace in logs do
 2 |    counter = initializeCounters( )
 3 |    foreach tsFired in tokenGame do
 4 |    |    manageCounter(tsFired)
 5 |    |    foreach andOperators in tsToAnds[tsFired] do
 6 |    |    foreach andOperator, branchIndex in andOperators do
 7 |    |    |_ record(trace, andOperator, branchIndex)
   |    |_
 8 |    |    if tsFired in tsToXors then
 9 |    |    |_ record(trace, tsToAnds[ts Fired], tsFired)
10 |    |    if tsFired in tsToLeaveLoop then
11 |    |    |_ record (trace, tsLeavingLoops[tsFired], counter[tsFired])
   |    |_
   |_
12 function manage Counter(tsFired):
13 |    if tsFired in tsToAnds then
14 |    |    foreach andOperator in tsToAnds[tsFired] do
15 |    |    |_ counter[andOperator].increment( )
   |    |_
16 |    if tsFired in tsIncrementLoops then
17 |    |    counter[tsFired].increment( )
18 |    |    foreach dependentTransition in dependentTransitions[tsFired] do
19 |    |    |_ counter[tsFired].reset( )
   |    |_
   |_
20 function record(trace, transition, value):
21 |_   laFM[trace][getTerminology(transition)] = value
```

Figure 3:
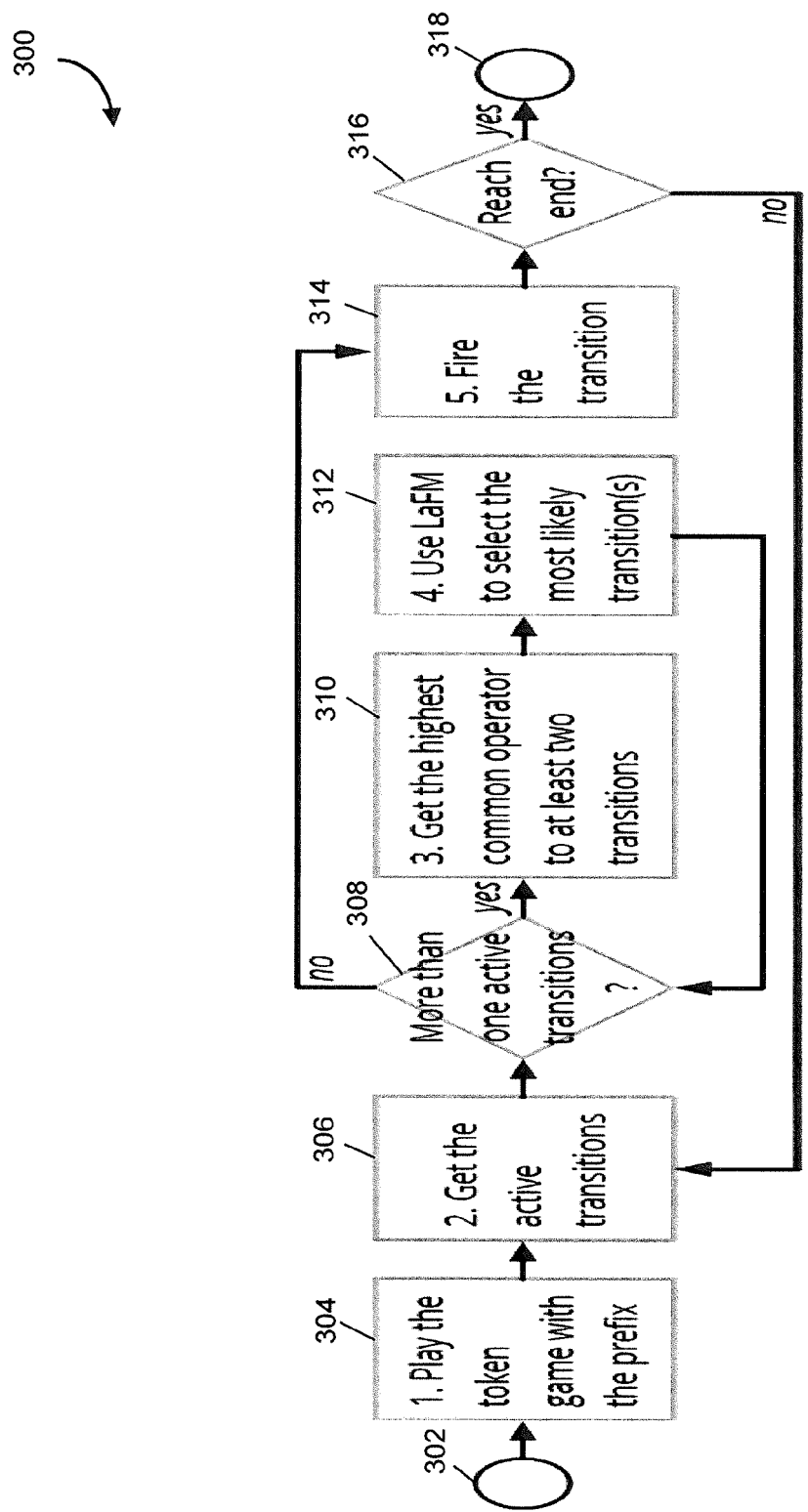
FIG. 3 is a computer implemented method diagram illustrating five steps in making prediction using LaFM, according to some embodiments.

Referring to FIG. 3, there is an example computer implemented method 300 showing how predictions may be made using the LaFM. The method for prediction may include a five step recursive process 300, but the steps shown are non-limiting examples and other steps are possible, in different orders.

At 302, the method for prediction begins.

At 304, the system conducts the token game with the prefix to get a list of active tokens.

At 306, from the tokens, the system obtains a list of active transitions.

At 308, if only one transition is active, the process includes skipping 310 and 312 to execute the transition (314). Otherwise, the process includes recursively eliminating transitions that are less likely (310 and 312).

At 310, the process then determines the highest (closest to the root) operator in the process tree common to at least two transitions. For example, in FIG. 1A, if the active transitions are a, b, and d, the highest common operator is and2.

At 312, the process then generates a decision about the operator selected at 310, based, for example, on the approach described below and/or variations thereof.

Figure 4:
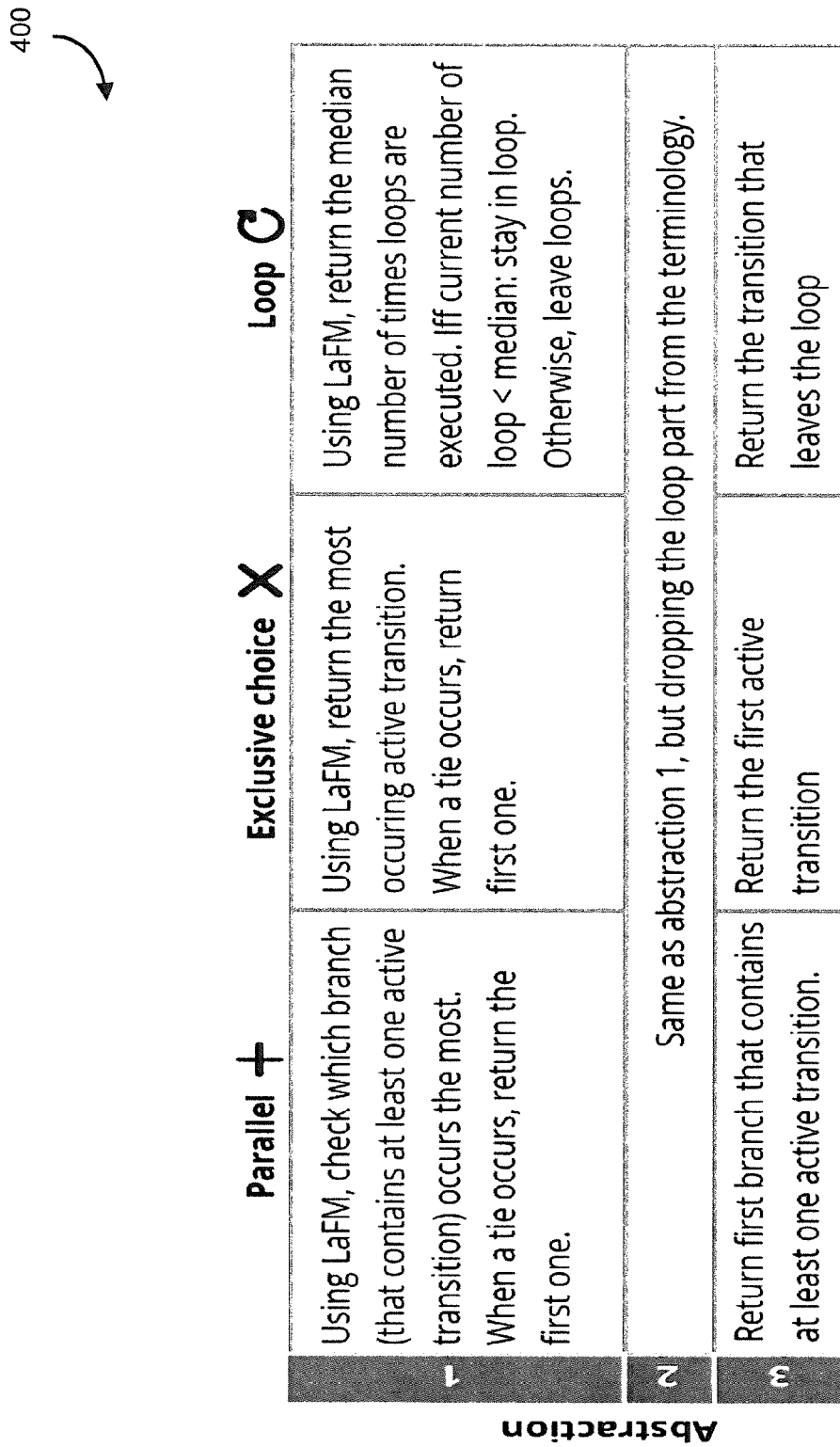
FIG. 4 is a table showing decisions for each operator type at three level of abstractions, according to some embodiments.

Depending on the operator type, the process determines the branch to execute next, what decision to make at an exclusive gateway, or whether to stay in or leave a loop. FIG. 4 includes a table 400 detailing how information is retrieved in LaFM.

In FIG. 2, in order to know which one of F and G is the transition most likely to be chosen the first time the system encounters xor7, the system evaluates LaFM for xor7|loop5{1} and observes that F occurs more often (three times out of four). When a tie occurs, the system, for example, can pick the first one. The number of loops in the prefix might exceed the number of loops that were observed in the data.

Alternatively, the process might have a particular order in the prefix that was never observed in the event logs. The approach includes three levels of process abstraction that can be applied consecutively when the previous abstraction fails.

The first level of abstraction is to use LaFM as is. The second level of abstraction is to drop the loop part of the terminology and concatenate the columns for the same operator. For example, if xor7|loop5{3} does not exist in LaFM, the system performs a concatenation of the two columns starting with xor7|. If there is still not enough information, the third abstraction is to make a decision by looking only at the Petri net.

For parallel and exclusive choice transitions, the approach selects the first branches with active transitions. For a loop, the decision, in some embodiments, is to always to leave the loop. Using these three abstractions, the approach can always make a prediction. If the list of potential transitions has been reduced to 1, the process transitions to step 5. Otherwise, the process recursively returns to step 3 where the highest common operator will inevitably be lower.

At 314, the systems executes the transition. If it is a task∈E, the process adds it to the suffix.

At 316, the system checks to see if it has reached the end of the Petri net. If yes, the system returns the suffix. If not, the system returns to 310.

Having defined how to build and use LaFM, the next section details the evaluation procedure used to assess the quality of the predictions.

Evaluation Procedure

The evaluation procedure is similar that provided in Tax et al. in [13]. Two-thirds of the traces in the event logs are added to the training set. Each trace in the evaluation is tested from a prefix length of 2 to a prefix length of l−1, l being the length of the trace. For instance, the trace ⟨ABCD⟩ is decomposed into: prefix: ⟨AB⟩, suffix: ⟨CD⟩ and prefix: ⟨ABC⟩, suffix: ⟨D⟩.

The extracted prefix is added to the evaluation set and the suffix is added to the ground truth set. After learning from the training set, the evaluation set is used to make predictions about the prefix. The accuracy is obtained by measuring the Damerau-Levenshtein similarity between the predicted suffix and the ground truth set. The Damerau-Levenshtein distance, [4], is an edit-distance-based metric that minimizes the number of substitutions, deletions, or additions that are needed to align two sequences.

In contrast with the Levenshtein distance, the Damerau-Levenshtein distance allows one to swap two adjacent activities. Let e be the evaluation set, Pi the $i^{th}$ predicted suffix, and $t_i$ the $i^{th}$ ground truth suffix. A whole evaluation set is evaluated using the following formula:

$$DamerauSimilarity(e) = 1 - \frac{\sum_{i=1}^{|e|} \frac{DamerauDistance(Pi, ti)}{\max(\text{length}(pi), \text{length}(ti))}}{|e|} \quad (1)$$

A Damerau similarity of 1 means that the predicted suffix is identical to the ground truth. The evaluation procedure is used in the next section to evaluate the performance of LaFM on synthetic datasets as well as later in the description where the performance of c-LaFM is tested on real datasets.

All evaluations were processed on a Mac Pro with the following configuration: 3.5 GHz 6-Core Intel Xeon E5, 64 GB 1866 MHZ DDR3. Applicants slightly updated LSTM[3] so that it does not predict the time remaining. Applicants confirmed that this change does not impact the accuracy of the next event predictions and slightly reduces the execution time.

LaFM: Evaluation

To evaluate LaFM, Applicants used a collection of 30 synthetic datasets[4] that were created from process trees of varying shapes and complexities. These datasets were initially created and used in for testing process discovery and conformance checking techniques.

Figure 5:
FIG. 5 is a table comparing LaFM, LSTM and Markov Chains using the Damerau similarity metric, according to some embodiments. The closer to 1, the closer the predictions are to the ground truth.

There are three rounds of evaluation. In each round, 10 process trees were generated. The complexity of the process trees as well as the number of traces generated increase with the round. Overall, 64 cases were generated in round 3, 256 cases in round 4, and 1025 in round 5. Applicants compared the predictions obtained using LaFM, Markov chains, and LSTM. Applicants ran the evaluation five times. The arithmetic means of these five runs is shown in table 500 on FIG. 5. LaFM is deterministic, therefore, its variance is null. The predictions made using LaFM are closest to the ground truth (21 times), followed by LSTM (8 times), and Markov chains (4 times).

Figure 6:
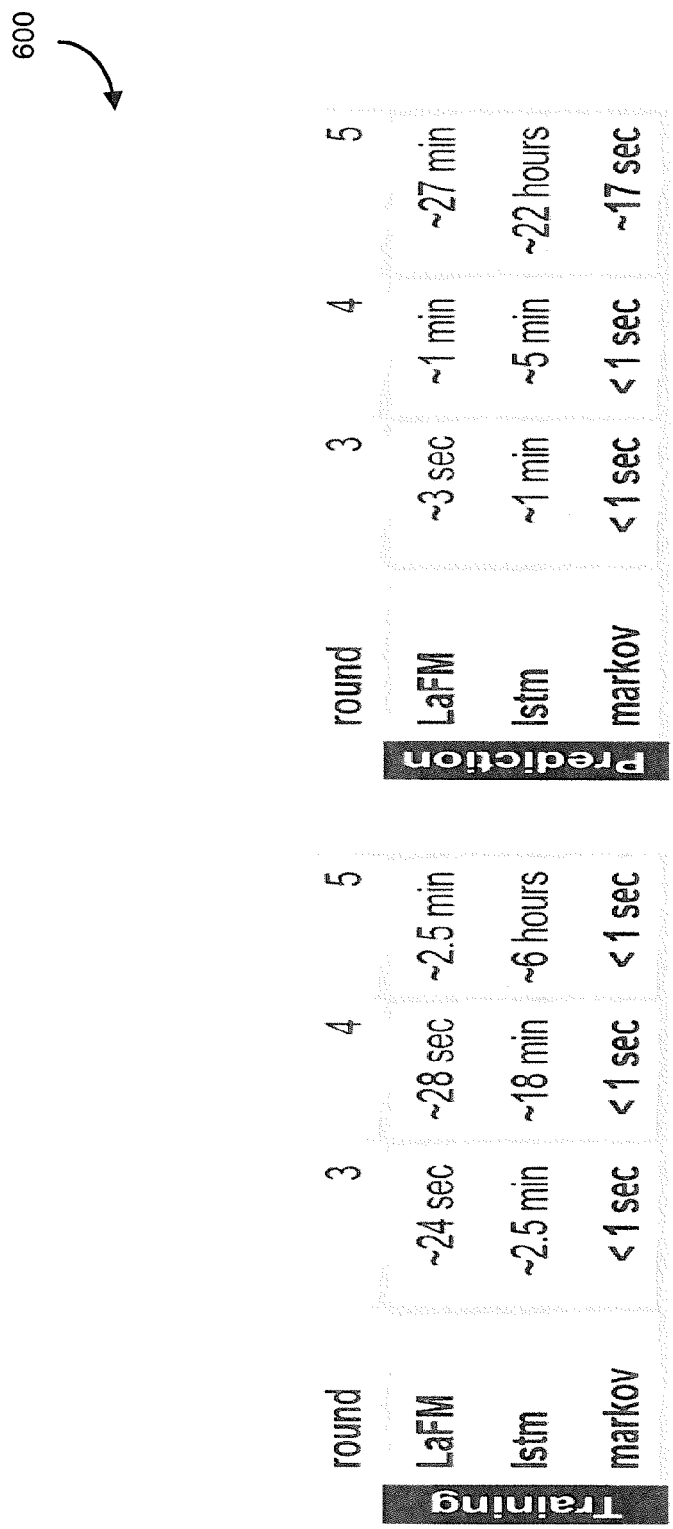
FIG. 6 is a table comparing performance of the training and predictions times, according to some embodiments.

There are important differences in the execution times of the three techniques (FIG. 6, table 600 shows the comparison timeframes). Because its predictions rely only on the previous observed event, it is not surprising that the fastest predictions are made using Markov chains, followed by LaFM. To put the duration into perspective, the average execution time per dataset is approximately 111 times slower for LaFM compared to a Markov chain, and 6140 times slower for LSTM compared to a Markov chain.

c-LaFM: Clustered Loop-Aware Footprint Matrix

The accuracy of the predictions made using LaFM is dependent on the quality of the discovered process tree. While the previous section showed that LaFM performs well with synthetic datasets generated from well-structured process trees, the accuracy will drop with real datasets, which often have very complex behaviors and noise that cannot be described well using a single model. Applicants' approach is that Applicants should group similar traces using clustering techniques and, for each group, discover a process tree that well describes a subset of similar traces. Hence, Applicants propose an updated version of LaFM with a clustering step, coined c-LaFM for clustered LaFM.

Figure 8:
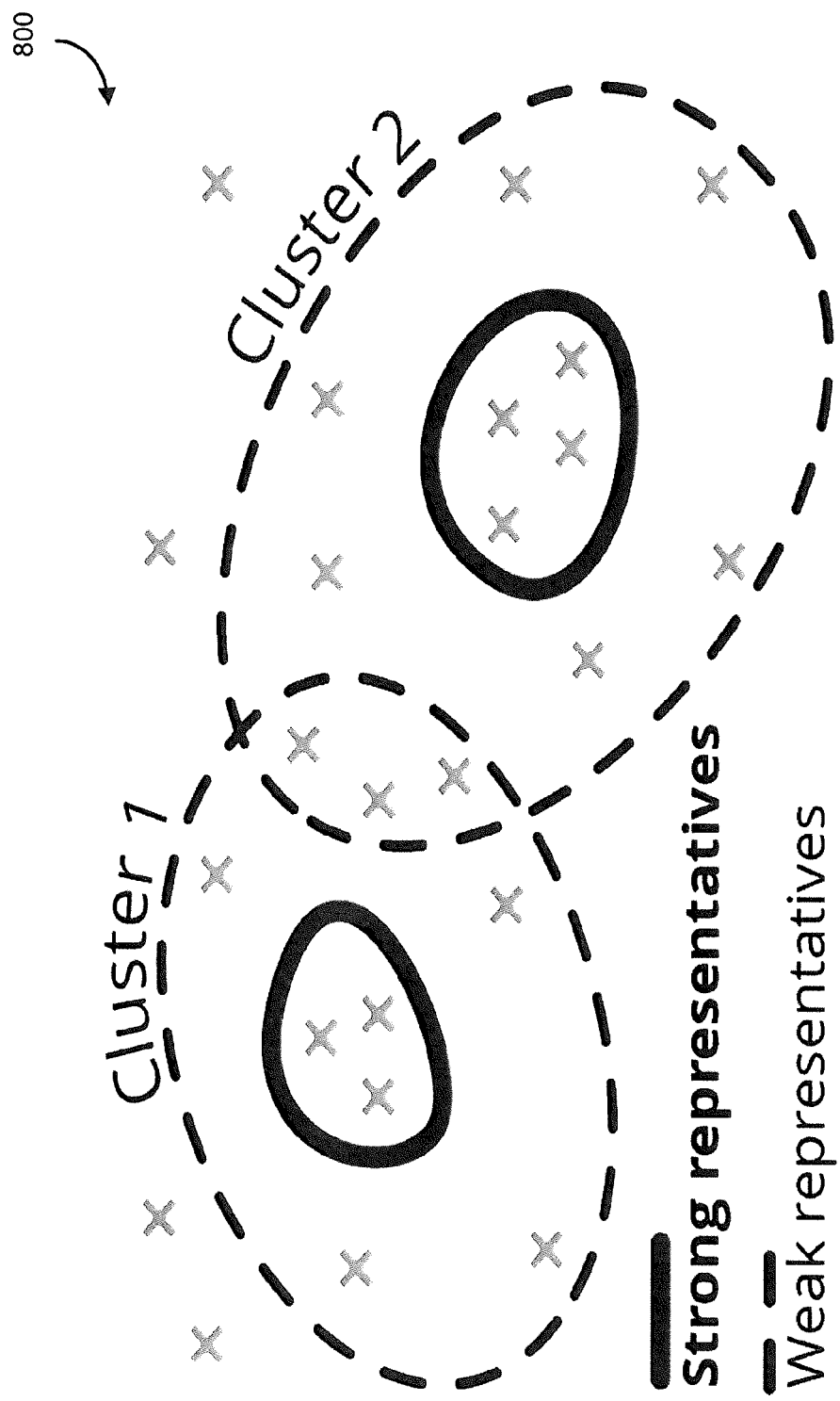
FIG. 8 is an illustration of the soft clustering, according to some embodiments.

Applicants propose a four-step computer-implemented clustering method, as shown in FIG. 8. In step 1, the system extracts the features that will be used to group similar traces. Thus, the system counts the number of n-grams ranging in size from 1 to 2. For instance, the trace ⟨ABA⟩ becomes: ⟨A: 2, B: 1, AB: 1, BA: 1⟩. Then, the system clusters the traces using HDBSCAN[5], which has the advantage of having only one intelligible parameter to set, the minimum number of traces per cluster. According to an experiment, from 2 to 10 traces per cluster yields the best results. However, it is difficult to anticipate the best minimum cluster size.

Hence, Applicants perform a hyper-parameter optimization of a type grid search by using 10% of the training data set to evaluate the accuracy of the minimum cluster size and retain the best-performing one. Instead of attributing each trace to a single cluster, Applicants rely on a soft clustering approach, which returns, for each trace, the probability of it belonging to all the clusters.

Referring next to FIG. 8, there is shown an illustration 800 which includes the soft clustering approach. Each point represents a trace. The closer two traces are, the more n-grams they share.

The strong representatives are used to discover the process tree, while the weak representatives will be replayed over the process tree and are available in LaFM. The strong representatives are the traces that have a probability higher than 80% of belonging to a cluster and the weak representatives have a probability higher than 20% but less than 80%.

Figure 7:
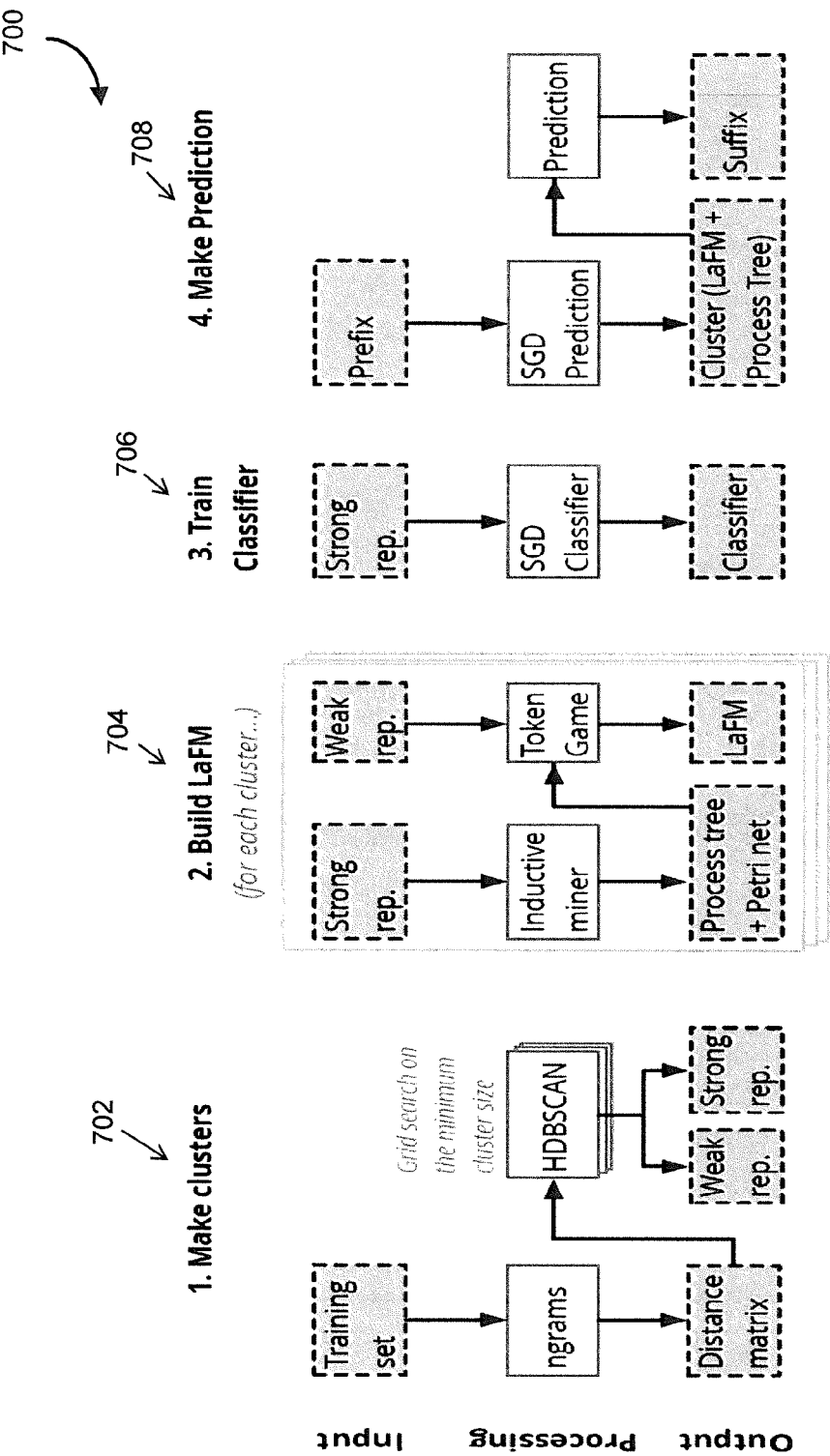
FIG. 7 is a computer implemented method diagram providing an overview of the 4 steps approach of c-LaFM, according to some embodiments.

Referring next to FIG. 7, there is shown a clustering approach in the example computer implemented method 700.

Using a soft clustering approach has two main advantages.

First, the inductive miner is sensitive to noise. Hence, Applicants want to learn only from the strong representatives (i.e., with a high probability of belonging to the clusters) with the aim of capturing only the core behaviors. Second, although Applicants do not use them to build the process trees, borderline traces might contain interesting behaviors for several clusters.

At 702, a soft clustering approach may be used, the system can assign single traces to several clusters.

At 704, the strong representatives are used to build the process tree. Then, the process tree is transformed to a Petri net so that the weak representatives can be replayed on it to build a local LaFM.

At 706, the system trains a stochastic gradient descent classifier to predict which cluster a prefix belongs to.

Although the clustering is done only once for the entire complete traces, Applicants build one classifier for each prefix length.

At 708, the system predicts the suffix of a given prefix using the cluster returned by the classifier. Altogether, these four steps allow Applicants to make predictions in the presence of noise and outliers, which are often found in real datasets.

c-LaFM: Evaluation

To test the approach, Applicants used six publicly available event logs, as described in Table 1. Because the event logs reflect activities performed in real life, making predictions is a complex task. Typically, for the event logs describing the execution of a building permit application (envPermit), "almost every case follows a unique path" [13].

TABLE 1

Datasets used for the evaluation.

| Name (doi) | Description | #cases | #events |
|---|---|---|---|
| 1 helpdesk (10.17632/39bp3vv62t.1) | Events from a ticketing system | 3,804 | 13,710 |
| 2 bpi12 (10.4121/uuid:3926db30-f712-4394-aebc-75976070e91f) | Loan process for a financial industry. Note: keeping only manual task and lifecycle: complete as described in [13] | 9,658 | 72,413 |
| 3 bpi13 closeP (10.4121/c2c3b154-ab26-4b31-a0e8-8f2350ddac11) | Closed problem—management system from Volvo IT Belgium | 6,660 | 1,487 |
| 4 bpi13 incidents (10.4121/3537c19d-6c64-4b1d-815d-915ab0c479da) | Incidents—management system from Volvo IT Belgium | 7,554 | 65,533 |
| 5 bpi13 openP (10.4121/500573e6-accc-4b0c-9576-aa5468b10cce) | Open problems—management system from Volvo IT Belgium | 819 | 2,351 |
| 6 envPermit (10.4121/uuid:26aba40d-8b2d-435b-b5af-6d4bfbd7a270) | Execution of a building permit application process. Note: we pick the Municipality 1 | 38,944 | 937 |

In contrast to LaFM, c-LaFM is non-deterministic due to the clustering step. Hence, Applicants ran the experiment 10 times with c-LaFM and LSTM.

Figure 9:
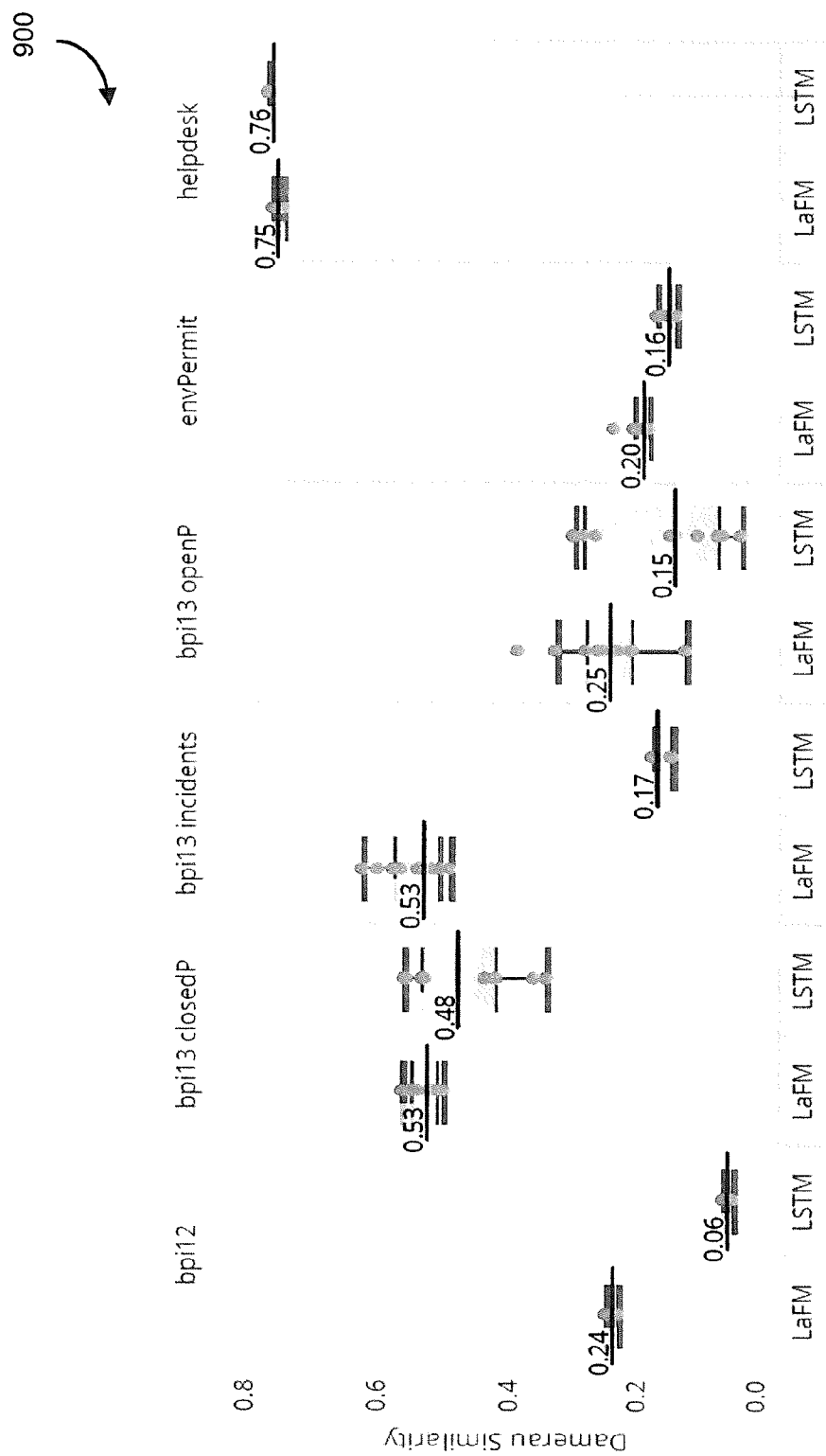
FIG. 9 is a graph comparing c-LaFM to LSTM using real datasets. Each datasets was evaluated 10 times, according to some embodiments.
Figure 10:
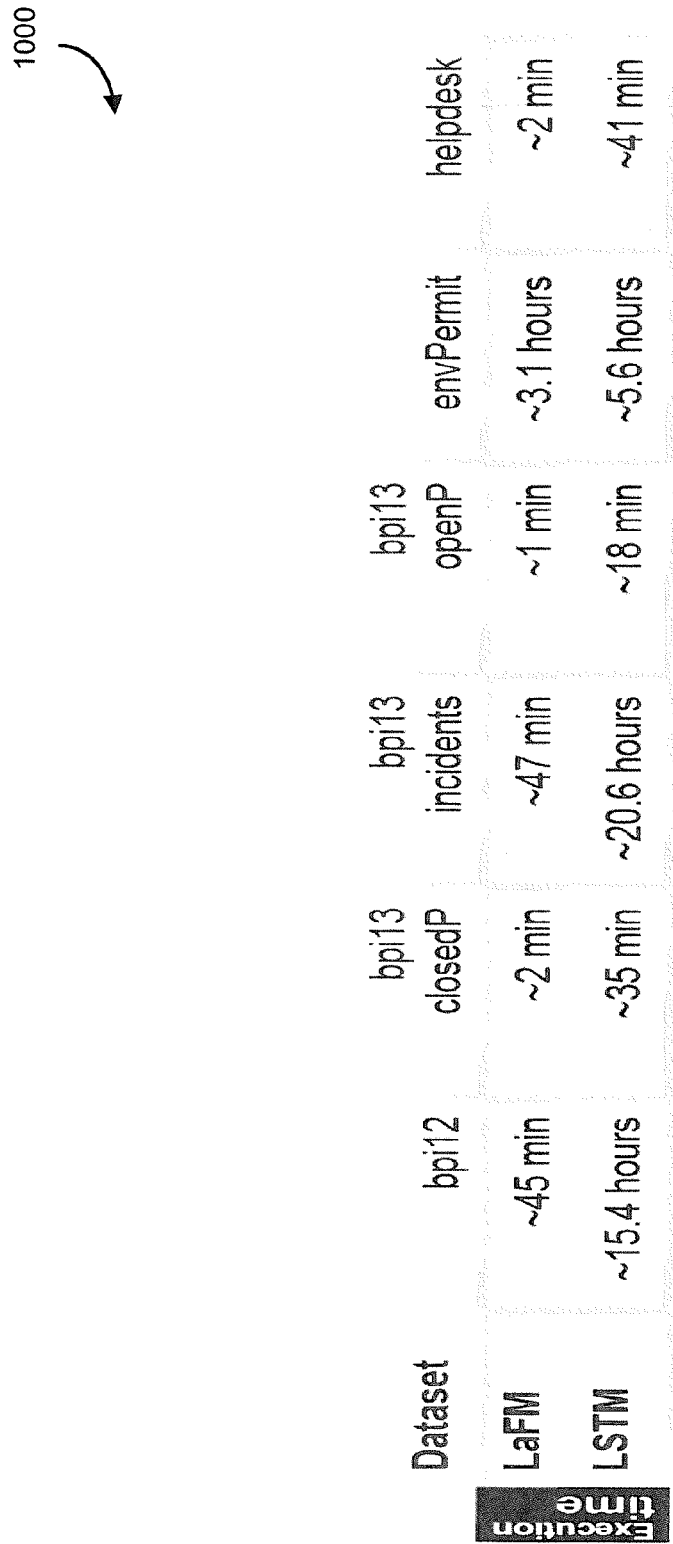
FIG. 10 is a graph comparing the total execution time to obtain predictions using c-LaFM and LSTM, according to some embodiments. The value reported is the average of 10 executions.

Referring next to FIG. 9, there is shown a graph 900 comparing the accuracy of LSTM and c-LaFM. c-LaFM is more accurate for five datasets out of six. Applicants compare the execution times in table 1000 of FIG. 10. On average, c-LaFM is 9 times faster than LSTM. Overall, Applicants have shown that the clustered version of LaFM is accurate and fast.

Figure 11:
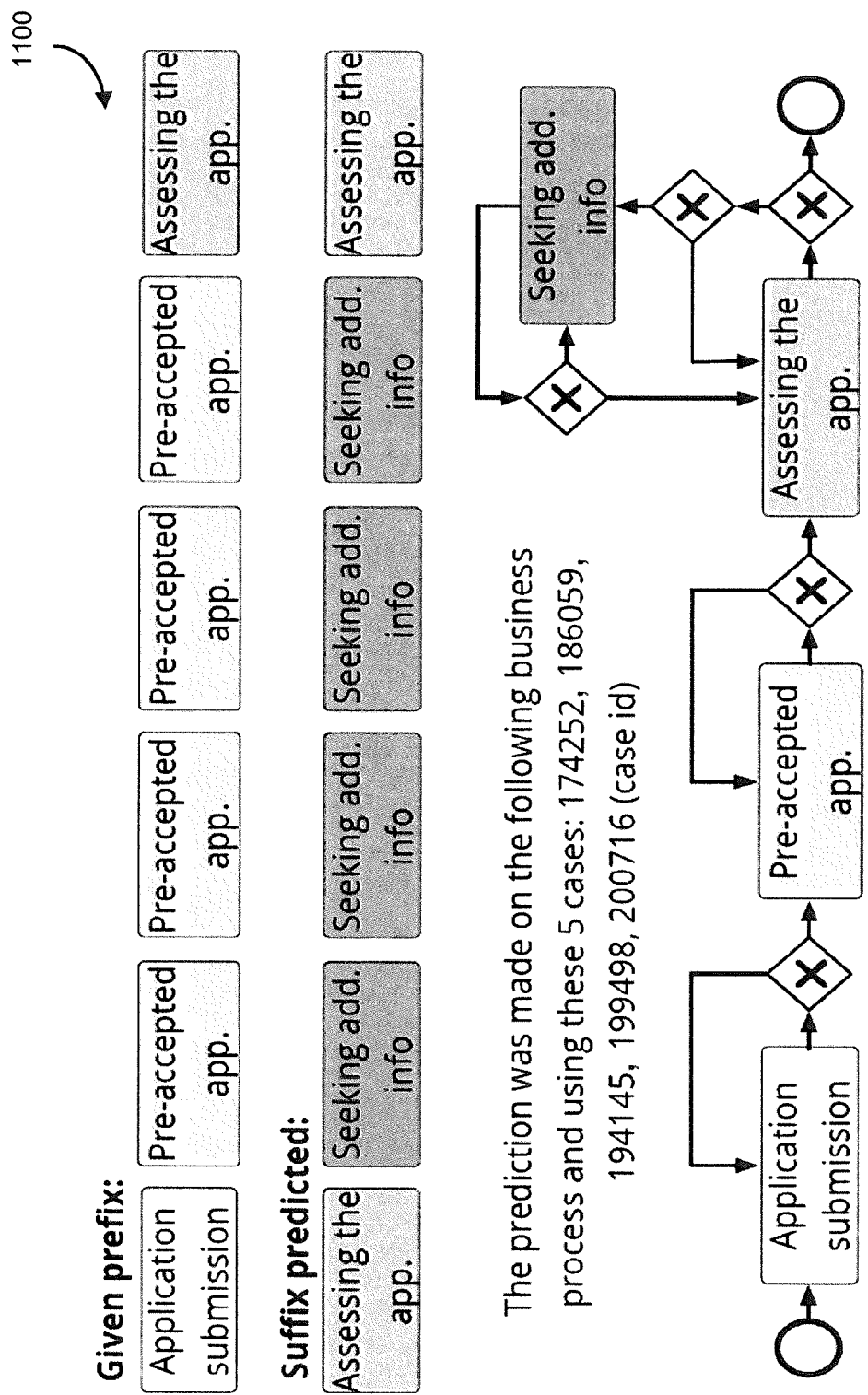
FIG. 11 is an illustration of a computer implemented method for displaying an actual prediction from the dataset envPermit next to the business process model that was used to make the prediction, according to some embodiments. The labels have been translated in English.

Referring next to FIG. 11, there is shown one of the predictions 1100 for the execution of a building permit using a business process model, which was derived from the process tree that was used to make the prediction.

This is an illustration of how the system can provide, not only the predictions itself, but a way to express the reasoning behind the prediction. For instance, a business worker could—after investigating cases like those used to make the prediction—decide not to trust the prediction because they have knowledge about the context that is not available in the event logs.

Referring next to FIG. 12, there is shown a schematic diagram of a computing device 1200 such as a server. As depicted, the computing device includes at least one processor 1202, memory 1204, at least one I/O interface 1206, and at least one network interface 1208.

Processor 1202 may be an Intel or AMD x86 or x64, PowerPC, ARM processor, or the like. Memory 1204 may include a combination of computer memory that is located either internally or externally such as, for example, random-access memory (RAM), read-only memory (ROM), compact disc read-only memory (CDROM).

Each I/O interface 1206 enables computing device 1200 to interconnect with one or more input devices, such as a keyboard, mouse, camera, touch screen and a microphone, or with one or more output devices such as a display screen and a speaker.

Each network interface 1208 enables computing device 1200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

Computing devices 1200 may serve one user or multiple users.

Computing device 1200, according to some embodiments, may reside at a data center as a special purpose machine, for example, that incorporates the features of the system 130 and is provided in a portable computing mechanism that, for example, may be placed into a data center as a rack server or rack server component that interoperates and interconnects with other devices, for example, across a network or a message bus. An example of such a special purpose machine would be a programmatic function sequencer unit such as a system on a chip or a printed circuit board component that is adapted for intelligent sequencing of processor execution activities (e.g., function invocation, initialization, shift register activities, control signal propagation).

CONCLUSION

An approach for path prediction is proposed that shows promising results in terms of accuracy and execution time. The results showcase the value of the process models discovered using a process discovery process.

Indeed, not only are these business models intrinsically interesting for business process analysts, but Applicants also show that they can be used to make predictions. Mining hidden rules between LaFM columns is proposed to yield interesting results, especially if one considers extending LaFM with contextual information. For example, this would allow a system to detect long-term dependencies that could be used to improve the accuracy further.

Business analysts can be reluctant to trust predictions they do not understand [3]. Because the predictions are made with business process models, the predictions can be inspected by business analysts. In some embodiments, the system returns only the predictions. In alternate embodiments, the system can be enhanced as a framework that includes an advanced visualization system that explains how the predictions are made and allows business analysts to alter the predictions if they have knowledge that is not in the data. This type of system would display the process model, the traces on which the predictions were made, and the reasoning behind the predictions. A move toward explainable artificial intelligence that gives visibility to business stakeholders "by leveraging historical data, explaining model inputs, simplifying results or exposing underlying data in human understandable ways" [2] is valuable. The approaches described herein contribute by providing the foundation on which a fully comprehensible prediction system can be built. Interestingly, in the same report, [2], Gartner states that there is a trade-off between explainability and accuracy. As noted herein in various embodiments, the results of the system tests highlight that this trade-off does not necessarily hold here as the system can provide results that are both transparent and more accurate than state-of-the-art neural network approaches.

ALTERNATE USAGES

For instance, when a service desk team predicts the paths taken by open tickets, the results can be used in many different ways, including interventions with the customer. One proposition is to cut the number of predicted complaints due to delays by changing the priority of tickets. Another is to reduce the negative impact on customer satisfaction by preemptively informing them about a delay. One more is to align the expertise of service desk agents with the events predicted for a ticket.

The predictions could also be used by inexperienced agents to anticipate the next events better, allowing them to communicate more accurate information to the customers. Overall, predicting paths can help to improve worker and customer satisfaction, as well as improve operational efficiency.

The embodiments of the devices, systems and methods described herein may be implemented in a combination of both hardware and software.

These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

REFERENCES 1. van der Aalst, W.: Process Mining: Data Science in Action. Springer (2016).
2. Alaybeyi, S., Baker, V., Clark, W.: Build trust with business users by moving toward explainable ai. Tech. rep., Gartner (October 2018).
3. Breuker, D., Matzner, M., Delfmann, P., Becker, J.: Comprehensible predictive models for business processes. MIS Quarterly 40 (4), 1009-1034 (2016).
4. Damerau, F. J.: A technique for computer detection and correction of spelling errors. Communications of the ACM 7 (3), 171-176 (1964).
5. Evermann, J., Rehse, J. R., Fettke, P.: A deep learning approach for predicting process behaviour at runtime. In: International Conference on Business Process Management. pp. 327-338. Springer (2016).
6. Gueniche, T., Fournier-Viger, P., Tseng, V. S.: Compact prediction tree: A lossless model for accurate sequence prediction. In: International Conference on Advanced Data Mining and Applications. pp. 177-188. Springer (2013).
7. Hochreiter, S., Schmidhuber, J.: Long short-term memory. Neural computation (8), 1735-1780 (1997).
8. Lakshmanan, G. T., Shamsi, D., Doganata, Y. N., Unuvar, M., Khalaf, R.: A markov prediction model for data-driven semi-structured business processes. Knowledge and Information Systems 42 (1), 97-126 (2015).
9. Leemans, S. J., Fahland, D., van der Aalst, W. M.: Discovering block-structured process models from event logs-a constructive approach. In: International conference on applications and theory of Petri nets and concurrency. pp. 311-329. Springer (2013).
10. Leemans, S.: Robust process mining with guarantees. Ph. D. thesis, Eindhoven University of Technology (2017).

11. Pitkow, J., Pirolli, P.: Mining longest repeating subsequences to predict worldwide web surfing. In: Proc. UsENIX symp. on Internet Technologies and systems. p. 1 (1999).
12. Polato, M., Sperduti, A., Burattin, A., De Leoni, M.: Time and activity sequence prediction of business process instances. Computing pp. 1-27 (2018).
13. Tax, N., Verenich, I., La Rosa, M., Dumas, M.: Predictive business process monitoring with lstm neural networks. In: International Conference on Advanced Information Systems Engineering. pp. 477-492. Springer (2017).
14. Vanhatalo, J., Völzer, H., Koehler, J.: The refined process structure tree. In: International Conference on Business Process Management. pp. 100-115. Springer (2008).

I claim:

1. A computer implemented method for maintaining a matrix data structure adapted for storing an electronic representation of a data process log including one or more data process traces, each data process trace representing a sequential series of execution instructions, the method comprising:
   receiving, at a processor, a process tree data structure generated by a process discovery engine configured to process the data process log to record, in a computer memory, algebraic splits represented in the data process log as one or more data operator functions;
   initializing, at the processor, the matrix data structure by:
      instantiating, in the computer memory, one or more rows, each row corresponding to a corresponding data process trace in the one or more data process traces;
      instantiating, in the computer memory, one or more columns, each column corresponding to a corresponding data operator function in the one or more data operator functions, wherein the one or more data operator functions comprises at least one loop element;
   populating, at the processor, data corresponding to each cell of the matrix data structure by replaying the corresponding data process trace on the process tree data structure to determine one or more indices assigned to each data operator function of the one or more data operator functions, wherein the one or more indices comprises information relating to an execution frequency of the at least one loop element;
   wherein:
      the process discovery engine is configured to recursively process the data process log to record algebraic splits;
      the data process log represents an execution log of executed computer instructions by a computer processor, and each data process trace of the one or more data process traces represents a set of sequential processing events of the computer processor; and
      the process discovery engine includes a plurality of process discovery mechanisms used in concert to generate a plurality of process path predictions;
   training the process discovery engine using a machine learning engine and a training set of labelled paths and corresponding predictions to determine an optimal process discovery mechanism of the plurality of process discovery mechanisms; and
   tuning the process discovery engine to utilize the optimal process discovery mechanism of the plurality of process discovery mechanisms.

2. The method of claim 1, wherein the each sequential processing event represents a transition between states of a concurrent processing model maintained by the computer processor.

3. The method of claim 1, wherein the process discovery engine is an inductive data miner engine.

4. The method of claim 1, wherein the training set of labelled paths includes decomposed segmentations of the one or more data process traces, where the one or more data process traces are decomposed into a plurality of combinations of prefixes and suffixes, such that the prefixes establish an evaluation set and the suffixes establish a ground truth set.

5. The method of claim 1, wherein the one or more data process traces are clustered into a plurality of clusters grouping similar data process traces; wherein a number of clusters of the plurality of clusters is determined using a hyperparameter optimization of a type grid search using a portion of a training data set and wherein the clustering is conducted using a soft clustering approach where, for each data process trace, a probability of the data process trace belonging to each cluster in the plurality of clusters is established.

6. A computer implemented method for maintaining a matrix data structure adapted for storing a representation of a data process log, wherein the data process log represents an execution log of executed computer instructions by a computer processor, including one or more data process traces, each data process trace representing a sequential series of execution instructions and a set of sequential processing events of the computer processor, the method comprising:
   receiving, at a processor, a process tree data structure generated by a process discovery engine configured to recursively process the data process log to record algebraic splits represented in the data process log as one or more data operator functions;
   initializing, at the processor, the matrix data structure by:
      instantiating one or more rows, each row corresponding to a corresponding data process trace in the one or more data process traces;
      instantiating one or more columns, each column corresponding to a corresponding data operator function in the one or more data operator functions; and
   populating, at the processor, each cell of the matrix data structure by replaying the corresponding data process trace on the process tree data structure to determine one or more indices assigned to each data operator function of the one or more data operator functions; and
   recursively generating, at the processor, a process path prediction suffix for a prefix representing a set of n events observed from an uncompleted data process trace using the matrix data structure by:
      iteratively adding sequential events to the process path prediction suffix until an end of a Petri Net represented in the process tree data structure by:
         generating, a list of active tokens;
         establishing, from the list of active tokens, a list of active transitions;
         while a number of active transitions is greater than one, recursively:
            selecting a selected data operator function of the one or more data operator functions that is common to at least two transitions and that is closest to a root;
            selecting a predicted transition depending on an operator type of the selected data operator function, the predicted transition including at least one of a selection of a branch for a next execution, a decision to be established at an exclusive gateway, or whether to stay in or leave a loop;

determining an updated number of active transitions, and if the number of active transitions is greater than one, recursing to the selecting of a next data operator function;

executing the predicted transition to add a sequential event onto the process path prediction suffix; and returning the suffix as a data structure, which in combination with the prefix represents a predicted completed data process trace based on the uncompleted data process trace.

7. The method of claim 6, wherein one or more execution processing instructions for a computer processor are generated based on the predicted completed data process trace.

8. The method of claim 7, wherein:

the selecting of the predicted transition includes determining that a particular order established in a current prefix being recursed is not represented in any of the one or more data process traces; and the selecting of the predicted transition further includes a first, a second, and a third sequential step of selection, which are applied consecutively when a previous step fails;

a first sequential step is to use the matrix data structure as-is;

a second sequential step is to drop a loop portion of the matrix data structure and to concatenate columns for a same operator; and a third sequential step is to make a decision by observing only the Petri Net represented by the process tree data structure.

9. A computer implemented method for maintaining a matrix data structure adapted for storing a representation of a data process log, wherein the data process log represents an execution log of executed computer instructions by a computer processor, including one or more data process traces, each data process trace representing a sequential series of execution instructions and a set of sequential processing events of the computer processor, the method comprising:

receiving, at a processor, a process tree data structure generated by a process discovery engine configured to recursively process the data process log to record algebraic splits represented in the data process log as one or more data operator functions;

initializing, at the processor, the matrix data structure by:

instantiating one or more rows, each row corresponding to a corresponding data process trace in the one or more data process traces;

instantiating one or more columns, each column corresponding to a corresponding data operator function in the one or more data operator functions; and populating, at the processor, each cell of the matrix data structure by replaying the corresponding data process trace on the process tree data structure to determine one or more indices assigned to each data operator function of the one or more data operator functions;

wherein:

the one or more data process traces are clustered into a plurality of clusters grouping similar data process traces, the clustering is conducted using a soft clustering approach where, for each data process trace, a probability of the data process trace belonging to each cluster in the plurality of clusters is established;

a number of clusters of the plurality of clusters is determined using a hyperparameter optimization of a type grid search using a portion of a training data set;

only the similar data process traces having probabilities greater than a pre-defined value of belonging to each cluster of the plurality of clusters are used to establish the process tree data structure; and the process tree data structure is transformed to a Petri Net such that the similar data process traces having probabilities less than or equal to the pre-defined value can be replayed upon the process tree data structure.

10. The method of claim 9 wherein a stochastic gradient descent classifier is trained to predict which cluster a prefix belongs to, and a suffix of a given prefix is predicted using the cluster returned by the stochastic gradient descent classifier.

11. A computer implemented system for maintaining a matrix data structure adapted for storing an electronic representation of a data process log including one or more data process traces, each data process trace representing a sequential series of execution instructions, the system comprising:

a process discovery engine configured to generate a process tree data structure by processing the data process log to record, in computer memory, algebraic splits represented in the data process log as one or more data operator functions;

a computer processor configured to initialize the matrix data structure on data storage by:

instantiating in the computer memory one or more rows, each row corresponding to a corresponding data process trace in the one or more data process traces;

instantiating in the computer memory one or more columns, each column corresponding to a corresponding data operator function in one or more data operator functions, wherein the one or more data operator functions comprises at least one loop element; and populating data corresponding to each cell of the matrix data structure by replaying the corresponding data process trace on the process tree data structure to determine one or more indices assigned to each data operator function of the one or more data operator functions, wherein the one or more indices comprises information relating to an execution frequency of the at least one loop element;

wherein:

the process discovery engine is further configured to recursively process the data process log to record algebraic splits; and the process discovery engine includes a plurality of process discovery mechanisms used in concert to generate a plurality of process path predictions; and the process discovery engine is adapted to:

train the process discovery engine using a machine learning engine and a training set of labelled paths and corresponding predictions to determine an optimal process discovery mechanism of the plurality of process discovery mechanisms; and tune the process discovery engine utilize the optimal process discovery mechanism of the plurality of process discovery mechanisms;

wherein the training set of labelled paths includes decomposed segmentations of the one or more data process traces, where the one or more data process traces are decomposed into a plurality of combinations of prefixes and suffixes, such that the prefixes establish an evaluation set and the suffixes establish a ground truth set.

12. A computer implemented system for maintaining a matrix data structure adapted for storing a representation of a data process log including one or more data process traces, each data process trace representing a sequential series of execution instructions, the system comprising:
a process discovery engine configured to generate a process tree data structure by recursively processing the data process log to record algebraic splits represented in the data process log as one or more data operator functions; and
a computer processor configured to:
initialize the matrix data structure on data storage by:
instantiating one or more rows, each row corresponding to a corresponding data process trace in the one or more data process traces;
instantiating one or more columns, each column corresponding to a corresponding data operator function in one or more data operator functions; and
populating each cell of the matrix data structure by replaying the corresponding data process trace on the process tree data structure to determine one or more indices assigned to each data operator function of the one or more data operator functions; and
recursively generate a process path prediction suffix for a prefix representing a set of n events observed from an uncompleted data process trace using the matrix data structure by:
iteratively adding sequential events to the process path prediction suffix until an end of a Petri Net represented in the process tree data structure by:
generating, a list of active tokens;
establishing, from the list of active tokens, a list of active transitions;
while a number of active transitions is greater than one, recursively:
selecting a selected data operator function of the one or more data operator functions that is common to at least two transitions and that is closest to a root;
selecting a predicted transition depending on a type of the selected data operator function, the predicted transition including at least one of a selection of a branch for a next execution, a decision to be established at an exclusive gateway, or whether to stay in or leave a loop;
determining an updated number of active transitions, and if the number of active transitions is greater than one, recursing to the selecting of a next data operator function;
executing the predicted transition to add a sequential event onto the process path prediction suffix; and
returning the suffix as a data structure, which in combination with the prefix represents a predicted completed data process trace based on the uncompleted data process trace.

13. The system of claim 12, wherein the one or more data process traces are clustered into a plurality of clusters grouping similar data process traces; wherein a number of clusters of the plurality of clusters is determined using a hyperparameter optimization of a type grid search using a portion of a training data set and wherein the clustering is conducted using a soft clustering approach where, for each data process trace, a probabilities of the data process trace belonging to each cluster of the plurality of clusters is established.

14. The system of claim 13, wherein only the similar data process traces having probabilities greater than a pre-defined value of belonging each cluster of the plurality of clusters are used to establish the process tree data structure, and the process tree data structure is transformed to the Petri Net such that the similar data process traces having probabilities less than or equal to the pre-defined value can be replayed upon the process tree data structure; and wherein a stochastic gradient descent classifier is trained to predict which cluster the prefix belongs to, and a suffix of a given prefix is predicted using the cluster returned by the stochastic gradient descent classifier.

* * * * *